United States Patent
Spear, Jr. et al.

(10) Patent No.: US 9,098,715 B1
(45) Date of Patent: Aug. 4, 2015

(54) METHOD AND SYSTEM FOR EXCHANGING CONTENT BETWEEN APPLICATIONS

(71) Applicant: OpenPeak Inc., Boca Raton, FL (US)

(72) Inventors: Stephen K. Spear, Jr., West Palm Beach, FL (US); Andrew James Dobson, Plano, TX (US)

(73) Assignee: OPENPEAK INC., Boca Raton, FL (US)

( * ) Notice: Subject to any disclaimer, the term of this patent is extended or adjusted under 35 U.S.C. 154(b) by 0 days.

(21) Appl. No.: 14/525,932

(22) Filed: Oct. 28, 2014

(51) Int. Cl.
  *G06F 21/60* (2013.01)
  *G06F 17/30* (2006.01)

(52) U.S. Cl.
  CPC ............ *G06F 21/606* (2013.01); *G06F 21/604* (2013.01); *G06F 17/30011* (2013.01)

(58) Field of Classification Search
  CPC ..... G06F 21/606; G06F 21/604; G06F 21/16; G06F 17/30011
  USPC ................................................. 713/193, 189
  See application file for complete search history.

(56) References Cited

U.S. PATENT DOCUMENTS

| | | | |
|---|---|---|---|
| 6,609,199 B1 * | 8/2003 | DeTreville | 713/172 |
| 8,812,868 B2 | 8/2014 | Blaisdell et al. | |
| 8,832,652 B2 | 9/2014 | Mueller et al. | |
| 8,850,424 B2 | 9/2014 | Friedman et al. | |
| 8,887,150 B2 | 11/2014 | Matenaar et al. | |
| 8,893,298 B2 | 11/2014 | Roark et al. | |
| 8,924,970 B2 | 12/2014 | Newell | |
| 8,955,142 B2 | 2/2015 | Blaisdell et al. | |
| 8,984,657 B2 | 3/2015 | Nerger et al. | |
| 2012/0311010 A1 * | 12/2012 | Shah | 709/201 |
| 2013/0063619 A1 * | 3/2013 | Asai | 348/222.1 |
| 2014/0230008 A1 | 8/2014 | Feroz et al. | |
| 2014/0230011 A1 | 8/2014 | Drewry et al. | |
| 2014/0245008 A1 | 8/2014 | Dabbiere et al. | |
| 2014/0245381 A1 | 8/2014 | Stuntebeck et al. | |
| 2014/0250505 A1 | 9/2014 | Kim et al. | |
| 2014/0280934 A1 | 9/2014 | Reagan et al. | |
| 2014/0282828 A1 | 9/2014 | Stuntebeck | |
| 2014/0282829 A1 | 9/2014 | Dabbiere et al. | |
| 2014/0282869 A1 | 9/2014 | Dabbiere | |
| 2014/0282894 A1 | 9/2014 | Manton | |
| 2014/0282897 A1 | 9/2014 | Stuntebeck | |
| 2014/0325664 A1 | 10/2014 | Nekhoroshev | |
| 2015/0019994 A1 * | 1/2015 | Freudenthaler et al. | 715/748 |

* cited by examiner

*Primary Examiner* — Jung Kim
*Assistant Examiner* — Ngoc D Nguyen

(57) ABSTRACT

A system and method for enabling the sharing of content between secure applications and unsecure applications are described herein. Content requests can be received from secure applications and unsecure applications. In response to the content requests, listings of options can be returned that have the ability to satisfy the content requests from the requesting secure applications or the requesting unsecure applications. In addition, selections of the options of the listings of options can be received through the requesting secure applications or the requesting unsecure applications. Content locations that are to be returned to the secure applications can be selectively modified such that subsequent content requests that involve the modified content locations are identified as being associated with an unsecure option.

23 Claims, 13 Drawing Sheets

METHOD AND SYSTEM FOR EXCHANGING CONTENT BETWEEN APPLICATIONS

FIELD OF TECHNOLOGY

The present description relates to methods and systems for controlling the sharing of content between applications and more particularly, for controlling the sharing of content between secure applications and unsecure applications.

BACKGROUND

In an effort to increase productivity, many employers allow their workers to conduct business related to the employer on their personal mobile devices. In some cases, employers also provide some of their employees with company-issued mobile devices. In either arrangement, an employer understands that a single device may include sensitive data related to that employer in addition to data that is personal to the employee. Several advances have been made in an effort to protect an employer's data in these circumstances. For example, OpenPeak Inc. of Boca Raton, Fla. has developed solutions that enable a mobile device to include both enterprise and personal data but that isolate the enterprise data from the personal data. As part of these solutions, an employee may download to the employee's mobile device secure applications that may be used to conduct transactions related to the enterprise. The employee's mobile device may also have several unsecure applications installed on the device. Consequently, a solution is needed to control the exchange of data between/among the secure and unsecure applications.

SUMMARY

A method of enabling the sharing of content between secure applications and unsecure applications is described herein. In the method, content requests from secure applications and unsecure applications may be received. In response to the content requests, listings of options that have the ability to satisfy the content requests from the requesting secure applications or the requesting unsecure applications can be returned. Selections of the options of the listings of options can be received through the requesting secure applications or the requesting unsecure applications. In addition, content locations that are to be returned to the secure applications can be selectively modified such that subsequent content requests that involve the modified content locations are identified as being associated with an unsecure option.

In one example, the unsecure option may be an unsecure application, and modifying the content locations that are to be returned can include appending a character to a uniform resource identifier associated with the unsecure application. As another example, some of the content requests may be requests to retrieve content for the requesting secure applications or the requesting unsecure applications. Alternatively, some of the content requests may be requests to share content from the requesting secure applications or the requesting unsecure applications.

If the content request is from a secure application to access content, the listing of options may include both secure and unsecure applications that have the ability to satisfy the content request from the requesting secure application. Conversely, if the content request is from an unsecure application to access content, the listing of options may include only unsecure applications that have the ability to satisfy the content request from the requesting unsecure application.

As mentioned above, the content request may be a request from a secure application to retrieve content. In this example, a conventional content request for unsecure options that have the ability to satisfy the conventional content request can be generated. Moreover, a secure content request for secure options that have the ability to satisfy the secure content request can be generated in this example. In another arrangement, returning the listings of options that have the ability to satisfy the content requests can include returning a combined listing of options that lists the unsecure options that have the ability to satisfy the conventional content request and the secure options that have the ability to satisfy the secure content request.

In some cases, the content requests from the secure applications and only from the secure applications can be selectively modified to ensure that the unsecure applications are prevented from processing such content requests. In addition, content locations that are to be returned to the secure applications and that are associated with a secure option can be modified.

A method of exchanging content between a secure application and an unsecure application is also described herein. A content request to access content can be generated through a secure application. In response to the content request, a combined listing that includes at least one secure application and at least one unsecure application, both of which have the ability to respond to the content request, can be returned. A selection of the unsecure application can be received. A content location that is to be returned to the secure application from the unsecure application can be modified to identify the content location as being associated with an unsecure application.

As an example, the content request to access content is an intent and the content location is a uniform resource identifier. In one embodiment, modifying the content location can include appending a character to the uniform resource identifier.

In another embodiment, a content request to share content can be generated through the secure application. The content request to share content can be modified such that any unsecure applications are prevented from being able to respond to the content request to share content from the secure application.

As an example, generating the content request to access content can include generating a conventional content request to access content from unsecure applications and generating a secure content request to access content from secure applications. Further, the unsecure applications may be unable to respond to the secure content request to access content. In another example, the secure application and the unsecure application can be registered with a system process to indicate to the system process that the secure application and the unsecure application are capable of responding to the content request to access content. The unsecure application can be launched in response to the selection of the unsecure application.

In one arrangement, the selected unsecure application can be installed on a computing device along with a corresponding secure application. A process of distinguishing between the selected unsecure application and the corresponding secure application can be performed based on the modified content location.

A computing device configured to enable the exchange of content is also described herein. The computing device can include an interface that is configured to display secure applications and unsecure applications that are installed on the computing device. The computing device can also include memory that is configured to store data associated with the secure applications and the unsecure applications and can further include a processing unit. The processing unit can be configured to receive a content request to access content in which the content request is from a requesting secure application and to cause a combined list of one or more other secure applications and one or more unsecure applications to be displayed on the interface. The processing unit can also be configured to receive a selection of an unsecure application of the combined list and to cause a content location to be modified such that the modified content location indicates that the modified content location is associated with an unsecure application.

As an example, the content request to access content is an intent, and the content location is a uniform resource identifier. As another example, the processing unit can be further configured to cause the content location to be modified by appending a character to the uniform resource identifier.

In one embodiment, the content request to access content can be made up of at least two requests, one of which is a secure request to access content and another of which is an unsecure request to access content. In this example, the processing unit can be further configured to cause the unsecure request to be generated such that unsecure applications are capable of responding to the unsecure request to cause the secure request to be generated such that secure applications and only secure applications are capable of responding to the secure request.

The processing unit can be further configured to receive a selection of a secure application of the combined list and to cause a second content location to be modified such that the modified second content location indicates that the modified second content location is associated with a secure application. The processing unit can be further configured to cause the selected secure application to be launched. In one arrangement, the computing device can further include an encryption unit. The encryption unit can be configured to decrypt data that is returned from the selected and launched secure application.

A computing device that has at least one secure application and at least one unsecure application installed thereon is also described herein. This computing device can include an interface that can be configured to display the secure applications and the unsecure applications and can also include a processing unit. The processing unit can be configured to receive a content request from one of the secure applications or one of the unsecure applications to share content. If the content request to share content is from an unsecure application, the processing unit can be configured to cause a combined list to be displayed on the interface in response to the content request that shows at least one unsecure application that is able to respond to the content request to share content and at least one secure application that is able to respond to the content request to share content. If the content request to share content is from a secure application, the processing unit can be configured to cause only one or more secure applications to be displayed on the interface that are able to respond to the content request to share content from the secure application in response to the content request from the secure application such that no unsecure applications are displayed on the interface in response to the content request from the secure application.

As an example, the secure application that is displayed in response to the content request to share content from the unsecure application is a container application that provides access to additional secure applications that are able to respond to the content request to share data from the unsecure application. As another example, the computing device can include an authentication unit that is configured to authenticate a user of the computing device if the user selects the container application or another secure application that is displayed in response to the content request to share data from the unsecure application.

In one arrangement, if the user selects the container application, the processing unit can be further configured to generate a secure content request that can be configured to be processed by a system process to enable a return of the additional secure applications that are able to respond to the content request to share content from the unsecure application. In another arrangement, if the content request to share content is from the unsecure application, the processing unit can be further configured to cause a content location to be modified to indicate that the content request to share content is from an unsecure application.

Further features and advantage, as well as the structure and operation of various embodiments, are described in detail below with reference to the accompanying drawings. It is noted that this description is not limited to the specific embodiments presented herein. Such embodiments are provided for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the subject matter described herein and, together with the description, further serve to explain the principles of such subject matter and to enable a person skilled in the relevant art(s) to make and use the subject matter.

Figure 1:
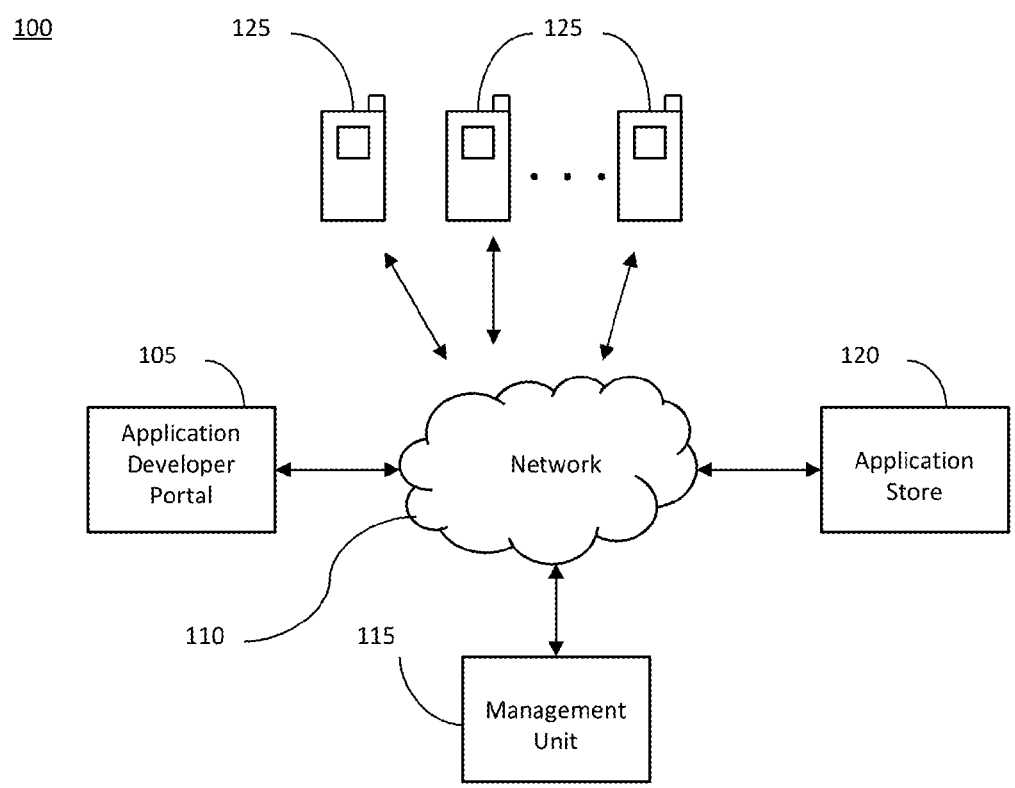
FIG. 1 illustrates an example of a system for the distribution of applications to computing devices.

The features and advantages of the embodiments herein will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

The following detailed description refers to the accompanying drawings that illustrate exemplary embodiments; however, the scope of the present claims is not limited to these embodiments. Thus, embodiments beyond those shown in the accompanying drawings, such as modified versions of the illustrated embodiments, may nevertheless be encompassed by the present claims.

References in the specification to "one embodiment," "an embodiment," "an example embodiment," "one arrangement," "an arrangement" or the like, indicate that the embodiment or arrangement described may include a particular feature, structure, or characteristic, but every embodiment may not necessarily include the particular feature, structure, or characteristic. Moreover, such phrases are not necessarily referring to the same embodiment or arrangement. Furthermore, when a particular feature, structure, or characteristic is described in connection with an embodiment or arrangement, it is submitted that it is within the knowledge of one skilled in the art to implement such feature, structure, or characteristic in connection with other embodiments or arrangements whether or not explicitly described. The word "among," as it is used throughout this description, should not necessarily be interpreted as requiring exchanges or interaction among three or more applications, irrespective of grammar rules. The word "a" is not necessarily limited to a singular instance of something, as it may mean one or more.

Several definitions that apply throughout this document will now be presented. The term "exemplary" as used herein is defined as an example or an instance of an object, apparatus, system, entity, composition, method, step or process. The term "communicatively coupled" is defined as a state in which two or more components are connected such that communication signals are able to be exchanged (directly or indirectly) between the components on a unidirectional or bidirectional (or multi-directional) manner, either wirelessly, through a wired connection or a combination of both. A "computing device" is defined as a component that is configured to perform some process or function for a user and includes both mobile and non-mobile devices. The term "computer readable storage medium" is defined as one or more components that are configured to store instructions that are to be executed by one or more processing units.

An "application" is defined as a program or programs that perform one or more particular tasks on a computing device. Examples of an application include programs that may present a user interface for interaction with a user or that may run in the background of an operating environment that may not present a user interface while in the background. The term "operating system" is defined as a collection of software components that directs a computing device's operations, including controlling and scheduling the execution of other programs and managing storage, input/output and communication resources. A "processing unit" or "processor" is defined as one or more components that execute sets of instructions, and the components may be disparate parts or part of a whole unit and may not necessarily be located in the same physical location.

The terms "memory," "memory element" or "repository" are defined as one or more components that are configured to store data, either on a temporary or persistent basis. The term "shared memory" is memory, a memory element or a repository that is accessible (directly or indirectly) by two or more applications or other processes. An "interface" is defined as a component or a group of components that enable(s) a device to communicate with one or more different devices, whether through hard-wired connections, wireless connections or a combination of both. An "input/output device" is defined as a device that is configured to at least receive input from a user or a machine that is intended to cause some action or other effect on a component with which the input device is associated.

The term "file system" is defined as an abstraction that is used to organize, store and retrieve data. The term "secure application" is defined as an application that has been modified from its original form to restrict communications between the application and unauthorized programs, applications or devices and to restrict operation of the application based on policy or to alter, augment or add features associated with the operation of the application (or any combination thereof). A "target application" is defined as an application that has been selected for conversion into a secure application. An "unsecure application" is defined as an application that has not undergone the modification required to convert the application into a secure application and, as such, is unable to obtain data from a secure application in view of an obfuscation scheme employed by or applied to that secure application. A "virtual machine" is defined as a platform-independent execution environment that emulates a physical machine.

The term "personal workspace" is defined as a workspace, profile or partition that is configured to contain the personal content and unsecure applications or other unsecure programs associated with a user of a computing device on which the personal workspace sits. The term "secure workspace" is defined as a workspace, profile or partition that is configured to contain secure content, secure applications and other secure programs and requires some form of authentication to be accessed.

The term "runtime" is defined as at least the portion of time that an application or other program is executing. A "secure namespacing scheme" is defined as a namespacing scheme that is designed to be unpredictable and for use only by secure applications. The term "secure request" is defined as a request that has been modified to conform to a secure namespacing scheme or some other obfuscation process designed to protect the request from being processed by an unsecure application or other program. In addition, a "secure return" is defined as a return that conforms to a secure namespacing scheme or some other obfuscation process designed to protect the return from being processed by an unsecure application or other program. The term "manifest" is defined as a file that contains information about an application that is designed to enable the application to interact with a system that supports the application.

The term "content" is defined as any type of material, information or data that is capable of being shared between applications. A "content request" is defined as a request originating from an application to access content from or provide content to one or more other applications. A "conventional content request" is a content request that is in accordance with the standard content request protocol set by an operating system or other controlling or managing objects on a computing device. A "secure content request" is a content request that is in a form such that it is recognizable by secure applications but not unsecure applications. The phrase "content location" is defined as information that is used to identify the location(s) of content, and the phrase "modifying content location" is defined as altering or amending content location strings to enable a distinction to be recognized between content location strings that are associated with unsecure applications and those that are associated with secure applications. The term "character" is defined as one or more symbols that represent data that can be processed by a processing unit or other component.

An "encryption unit" is defined as a component that is comprised of hardware and software and that is configured to encrypt and/or decrypt data. An "authentication unit" is defined as a component that is comprised of hardware and software and that is configured to authenticate a user, other component or entity prior to that user, other component or entity being granted access to a secure application or some other secure or protected data.

As explained earlier, solutions have been developed that enable a mobile device to include both enterprise and personal data but that isolate the enterprise data from the personal data. In particular, a user's device may include both secure and unsecure applications. Accordingly, it may be useful to provide ways to enable the selective exchange of data between secure and unsecure applications in an efficient manner.

In view of this need, a system and method for enabling the exchange of content between secure applications and unsecure applications are described herein. Content requests can be received from secure applications and unsecure applications. In response to the content requests, listings of options can be returned that have the ability to satisfy the content requests from the requesting secure applications or the requesting unsecure applications. In addition, selections of the options of the listings of options can be received through the requesting secure applications or the requesting unsecure applications. Content locations that are to be returned to the secure applications can be selectively modified such that subsequent content requests that involve the modified content locations are identified as being associated with an unsecure option.

Through this arrangement, secure and unsecure applications can selectively exchange data with one another. Moreover, in view of the modification of the content locations, confusion over whether a data request is intended for a secure application or an unsecure application can be avoided.

Referring to FIG. 1, a system 100 that is useful for distributing applications is shown. In one arrangement, the system 100 can include an application developer portal 105, a network 110, a management unit 115, an application store or repository 120 and any number of computing devices 125. Although not shown here, the system 100 can include multiple application developer portals 105, networks 110, management units 115 or application stores 120. Also, while FIG. 1 implies that the computing device 125 is a mobile unit, the system 100 and the processes described herein may be relevant to and practiced with fixed computing devices.

The application developer portal 105 can present an interface that enables developers of applications to upload their applications for eventual publication in the application store 120. The application store 120, as is known in the art, can enable users of the portable computing devices 125 to install such published applications on their devices 125. In some cases, the applications from the application developers may be directed to the management unit 115 prior to being published in the application store 120. Through the management unit 115, the applications may be modified such that they are more conducive for operation on behalf of an enterprise or other organization. For example, the applications may be converted into secure applications, a process in which certain intercepts may be imposed on an application during runtime such that functions of the application may be restricted, enhanced or otherwise modified in some way, depending on input from the enterprise. Examples of this process will be presented below. An application that has been selected for conversion into a secure application by the management unit 115 (or some other component) may be referred to as a target application. In addition, an application that has not undergone the process of conversion into a secure application may be referred to as a non-secure or unsecure application.

Once a secure application is generated, it can be published in the application store 120, similar to a conventional application that has been published. Because the application store 120 accepts and offers secure applications, it may also be referred to as a secure application store 120. In some cases, a secure application store 120 may be configured to accept and offer only secure applications, although in other scenarios it may accept and offer both secure and unsecure applications. In addition, a secure application store 120 may have limited access to a certain group of users, such as those associated with a particular enterprise, or it may be open to the general public. If access is limited to the secure application store 120, an accessing user may be required to provide some form of authentication before being granted such access. Moreover, the applications that are made available through the secure application store 120 are not necessarily required to be received from the application developer portal 105, as other sources may be used to provide applications to the secure application store 120.

The network 110 can facilitate communications between any of the components of the system 100. As mentioned earlier, there may be multiple networks 110 in the system 100, and each network 110 may be composed of various types of components to support wireless or wired communications (including both). In addition, the network(s) 110 may be configured to support both local or wide area communications (or both). In one arrangement, the management unit 115 may serve as a remote portal that can be used to manage certain features or operations of the computing devices 125, including the secure applications that may be installed in the computing devices 125.

Figure 2:
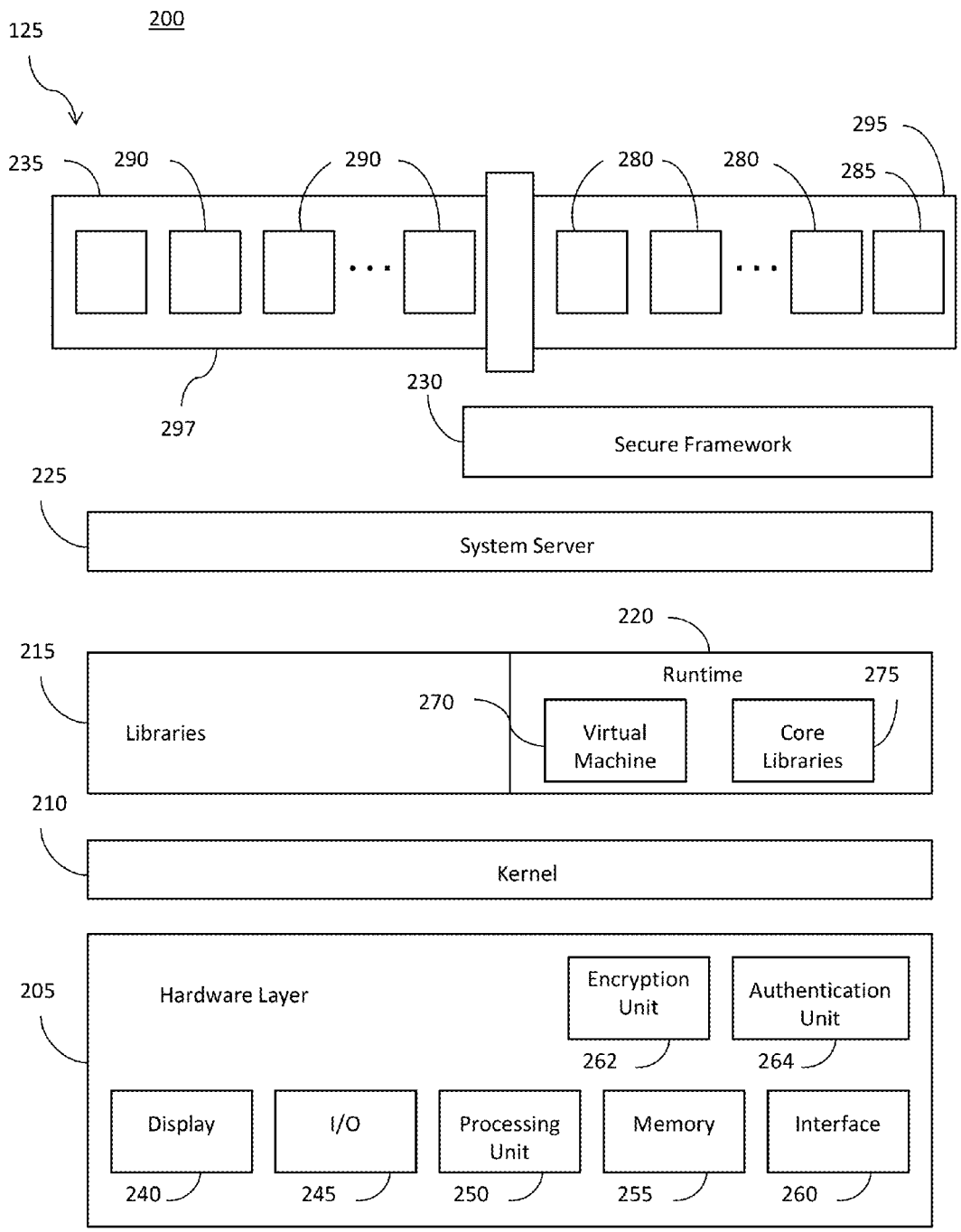
FIG. 2 illustrates an example of a block diagram of the system architecture of a computing device that is configured to practice the subject matter described herein.

Referring to FIG. 2, an example of a block diagram 200 of the system architecture of a computing device 125 is shown. In this arrangement, the computing device 125 can include a hardware layer 205, a kernel layer 210 and a libraries layer 215, which may include a plurality of native libraries. This architecture may also include a runtime environment 220, a system server 225, a secure framework 230 and an application layer 235.

In one arrangement, the hardware layer 205 may include any number and type of hardware components, such as one or more displays 240, one or more input/output (I/O) devices 245, one or more processing units 250 and any suitable type and number of memory devices 255 and interfaces 260. Examples of the I/O devices 245 include speakers, microphones, physical keypads, etc. In addition, the display 240 can serve as an I/O device 245 in the form of a touch-screen display. The interfaces 260 can be configured to support various types of communications, including wired or wireless and through any suitable type of standards and protocols. In some cases, the hardware layer 205 may also include an encryption unit 262 and an authentication unit 264. The encryption unit 262 can be configured to encrypt and/or decrypt content that is associated with the computing device 125, and the authentication unit 264 can be configured to authenticate users or components prior to such users or components being granted access to secure or otherwise protected information. The encryption unit 262 and the authentication unit 264 may be stand-alone components, or they may be part of the processing unit 250.

In addition, the runtime environment 220 can support any suitable number of virtual machines 265 and core libraries 270, and the system server 225 can serve as an abstraction for the underlying layers for the applications in the application layer 235 and can provide numerous system services for the applications. In this example, the application layer 235 may include any number of unsecure applications 275 and any number of secure applications 280, one of which may be a core secure application 285. The secure framework 230 can function similar to that of a conventional framework, but the secure framework 230 can facilitate the encapsulation of a number of secure applications 280 to selectively restrict their data exchanges with the unsecure applications 275. In particular, the secure framework 230 can be configured to intercept and modify certain calls from the secure applications 280, prior to passing them to the system server 225. Because the unsecure applications 275 may not be privy to the modification technique, the unsecure applications 275 may be unable to obtain data from a secure application 280. Additional detail on this process will be presented below.

In many cases, the unsecure applications 275 are associated with the personal data of a user of the computing device 125. In contrast, the secure applications 280 are typically associated with confidential or otherwise sensitive information that belongs to or is associated with an enterprise or some other organization, and the user of the device 125 may work for such an entity. In one arrangement, a virtual partition may be created on the computing device 125 in which the secure applications 280 (and the secure core application 285) are part of a secure workspace 295, and the unsecure applications 275 are part of a personal workspace 297. In certain cases, a user may be required to provide authentication information, such as a password, PIN or biometric data, to gain access to the secure workspace 295 or to any individual or group of secure applications 280. The authentication information may be verified by the authentication unit 264. In addition, the user may launch both secure applications 280 and unsecure applications 275 through the I/O device 245. As will be shown below, in some embodiments, a container application (not pictured here) may be used to access the secure workspace 295 or any of the secure applications 280.

As mentioned earlier, one of the secure applications 280 may be a secure core application 285. The core application 285 may include any number of files that can make up any number of shared libraries. As an example, the files may be Java Archive (JAR) files, and when the core application 285 is loaded, these JAR files may be copied to an appropriate repository of the computing device 125. As such, the core application 285 can be responsible for providing a certain number of classes that can make up the shared libraries, which can be made available to the secure applications 280. These classes, in some cases, can be substituted for certain system classes that would be normally used. In one arrangement, the secure framework 230 can be one or more libraries that are delivered by the core application 285.

Figure 3:
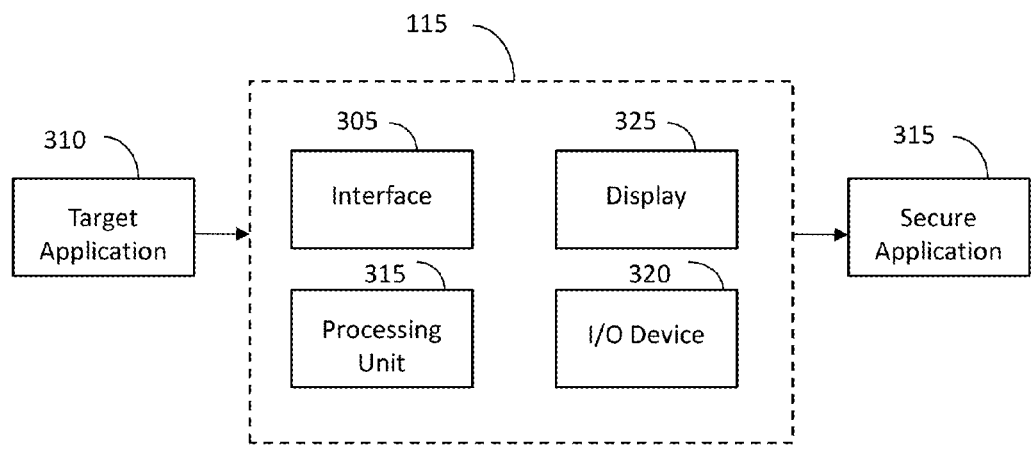
FIG. 3 illustrates an example of a block diagram of a management unit.

Referring to FIG. 3, an example of a block diagram of the management unit 115 of FIG. 1 is shown. In this example, the management unit 115 may include an interface 305 that can be configured to receive a target application 310. The interface 305 can be any suitable combination of components that are designed to receive the target application 310 from the application developer portal 105 via the network 110. The management unit 115 can also include one or more processing units 315, one or more I/O devices 320, one or more displays 325 and any suitable type and number of memory components. As will be explained below, when the target application 310 is received, the management unit 115 can be used to convert the target application 310 into a secure application 280, which may be eventually installed on the computing device 125.

Figure 4:
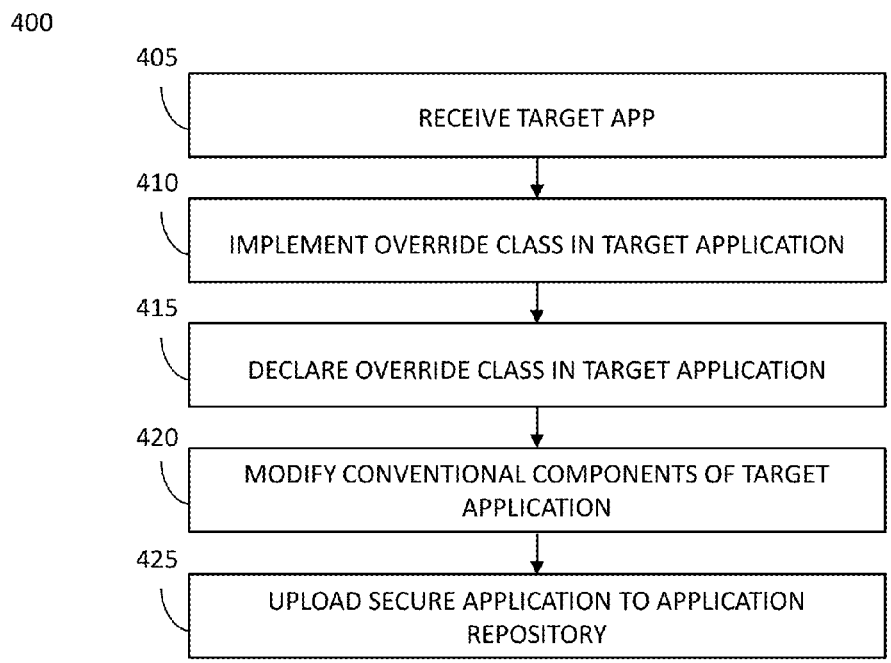
FIG. 4 illustrates an example of a method for creating a secure application to enable runtime injection of the secure application.

Referring to FIG. 4, an exemplary method 400 for creating a secure application to enable runtime injection of the application is shown. The method 400, however, may include additional or even fewer steps or processes in comparison to what is illustrated in FIG. 4. Moreover, the method 400 is not necessarily limited to the chronological order that is shown in FIG. 4. In describing the method 400, reference may be made to FIGS. 1, 2 and 3, although it is understood that the method 400 may be practiced with any other suitable systems and components and may take advantage of other suitable processes.

At step 405, a target application can be received, and an override class can be implemented in the target application, as shown at step 410. The override class can be declared in the target application, thereby creating a secure application, as shown at step 415. At step 420, conventional components of the target application may be modified to create corresponding secure components. In addition, at step 425, the secure application can be uploaded to an application repository for distribution to a computing device. Examples of these steps will be presented below.

In one arrangement, the management unit 115 can receive the target application 310, which can include conventional components and a manifest that presents information about the conventional components. A conventional component in this sense is a component that already exists in the target application and is capable of being modified as part of the process in converting the target application 310 into a secure application 280. Examples of conventional components include intents and intent filters, activities, services and content providers. Another example of a conventional component is an application class, which, as is known in the art, is a base class for maintaining global variables.

Once the target application 310 is received, an override class can be implemented in the target application 310, as mentioned earlier. For example, an application tag in the manifest can be modified to cause the override class to extend the pre-existing application class. As part of this process, in one embodiment, the override class can be declared in the manifest of the target application 310. In view of this configuration, at launch, the override class can be loaded prior to any of the conventional components. Any adapt code can be integrated into the target application 310 to ensure that this process occurs. As will be explained further below, the override class can cause an override class loader, which may be part of the secure core application 285, to be injected into the normal system operation.

Steps can also be taken to modify other conventional components of the target application 310. For example, any number of the intents, intent filters, activities, services and content providers recited in the manifest of the target application 310 may be modified or decorated to create corresponding secure components. The conventional components that are modified may be components that are well-known in view of the design of the target application 310 in relation to an operating system of the computing device 125. In view of this decoration process, these corresponding secure components may be in compliance with a predetermined (and unpredictable) namespacing scheme, which can be used to ensure the security of the interprocess communications of the secure applications 280. The technique of modifying the conventional components in the manifest is also useful for intent resolution. At this point, or alternatively when the override class is implemented or declared, the target application 310 may be considered to be a secure application 280.

In one arrangement, the secure application may be uploaded to an application repository, such as an electronic application store. The computing device 125 may be configured to access the repository and can download and install the secure application 280. Once installed, steps can be taken to enable runtime injection of the secure application 280, as will be explained below.

Figure 5:
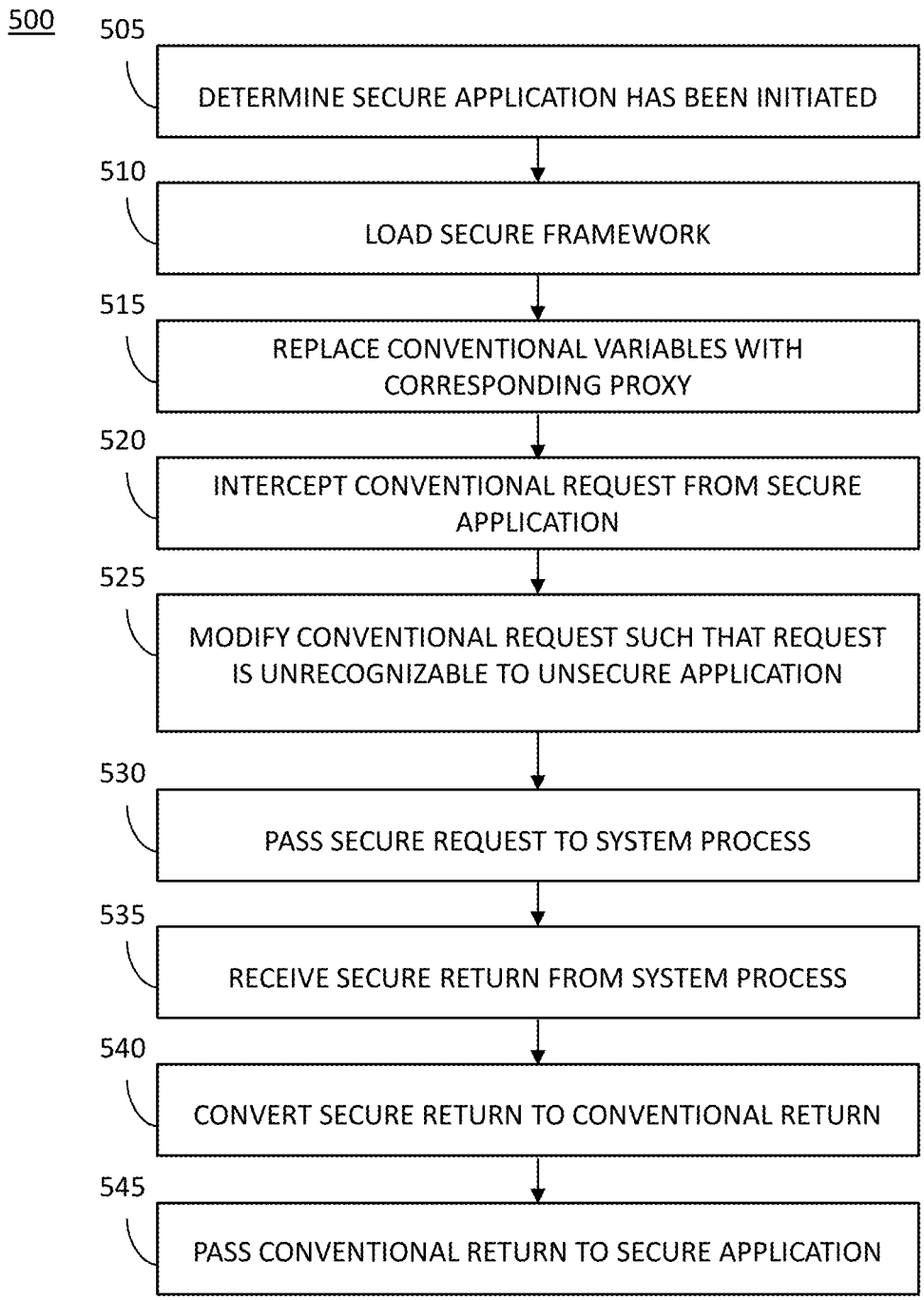
FIG. 5 illustrates an example of a method of runtime injection for a secure application.
Figure 6:
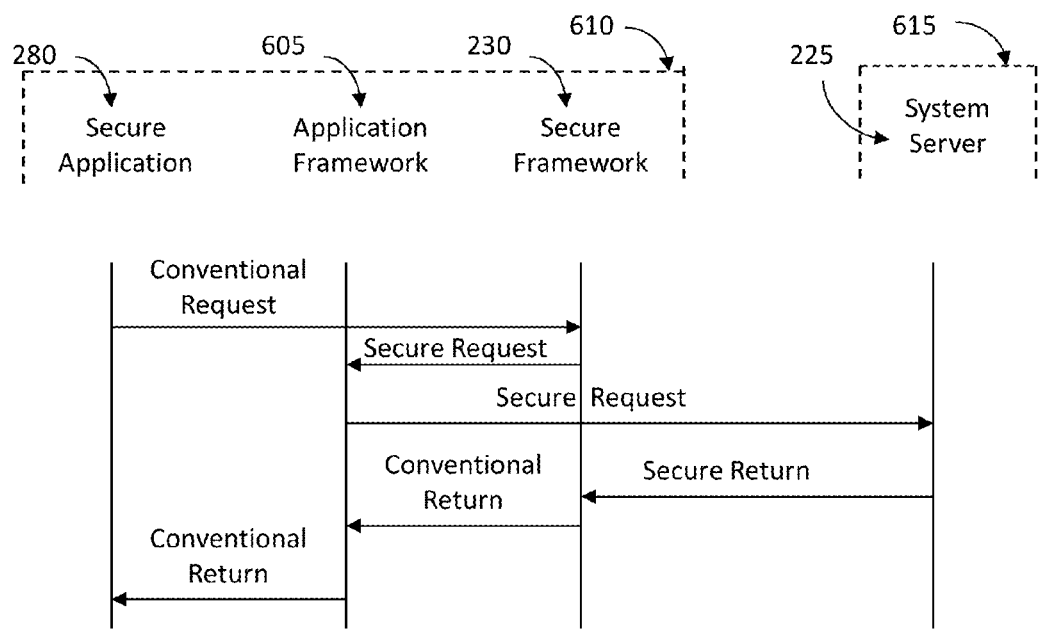
FIG. 6 illustrates an example of a signal-flow diagram of runtime injection for a secure application.
Figure 7:
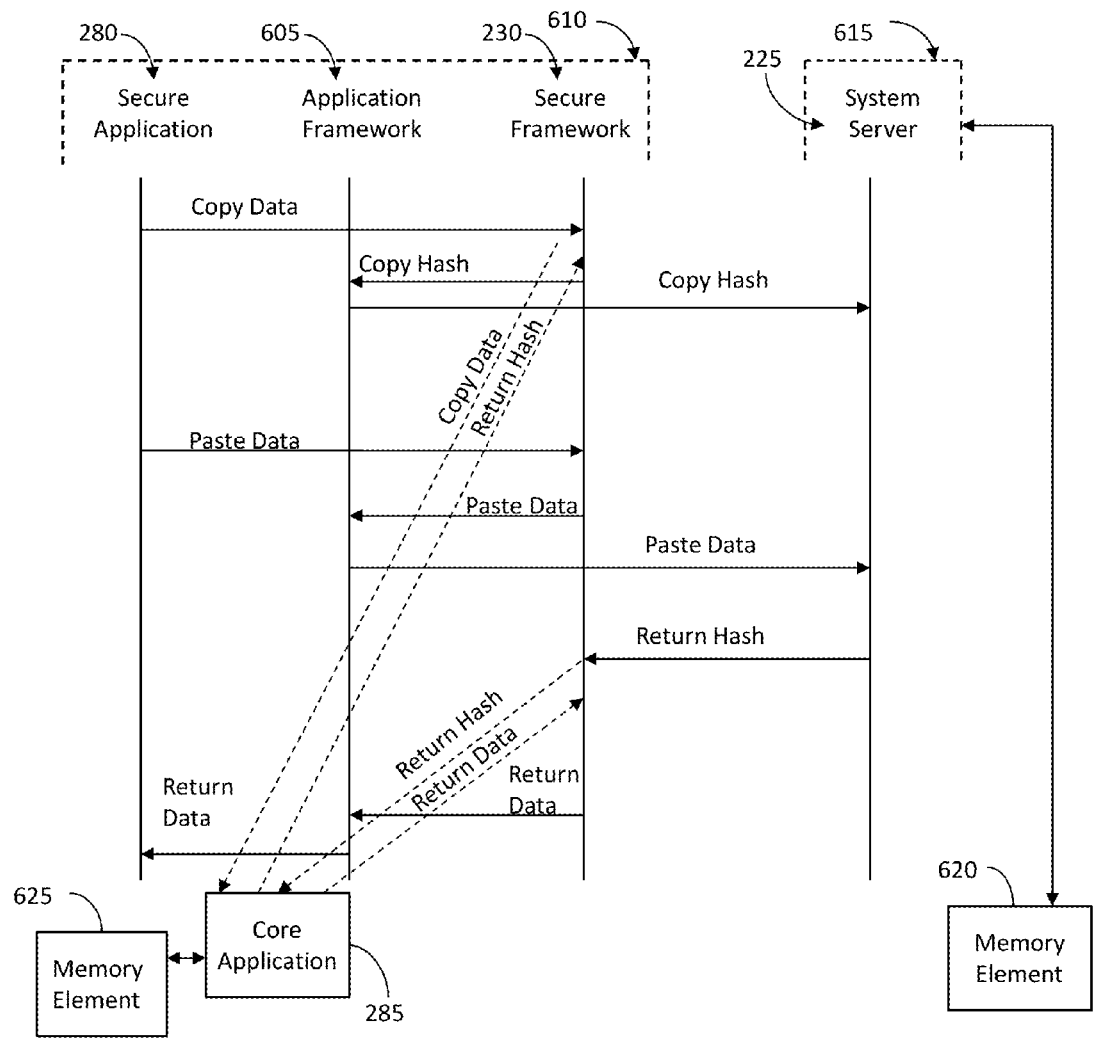
FIG. 7 illustrates another example of a signal-flow diagram of runtime injection for a secure application.

Referring to FIG. 5, a method 500 for runtime injection is illustrated. The method 500, however, may include additional or even fewer steps or processes in comparison to what is illustrated in FIG. 5. Moreover, the method 500 is not necessarily limited to the chronological order that is shown in FIG. 5. In describing the method 500, reference may be made to FIGS. 1, 2 and 3, although it is understood that the method 400 may be practiced with any other suitable systems and components and may take advantage of other suitable processes. Reference may also be made to FIGS. 6 and 7, which show examples of message exchange between several components, to help explain the method 500, although other exchange models may be applicable here.

At step 505, it can be determined that a secure application has been initiated, and at step 510, an instance of a secure framework can be loaded as part of the process of the secure application. In response to the initiation of the secure application, one or more conventional variables associated with the secure application may be replaced with a corresponding proxy, as shown at step 515.

For example, when the secure application 280 is installed on the computing device 125, the (decorated) secure components can be registered with the system server 225 or some other element of the system of the computing device 125. In addition, as previously noted, the core application 285 of the computing device 125 may include any number of libraries that may be shared among the secure applications 280, including the secure framework 230.

When a secure application 280 is initiated, the override class can be initiated prior to the application class, and the override class can be responsible for loading the shared libraries of the core application 285, one of which may be an override class loader. Moreover, as part of this flow, an instance of the secure framework 230 can be loaded as part of the process of the initiated secure application 280. As such, the override class loader can enable the secure application to access the shared libraries of the core application 285, even though the secure application 280 may have been initially unaware of them.

As part of this initial set-up of the secure application 280, the override class loader can also enable runtime hooks to be set up for the secure application 280. As an example, the override class loader can load an encryption manager that can establish runtime encryption hooks and a service manager that can set up other runtime hooks for any number of system services. In one arrangement, this procedure can cause one or more conventional variables of the application framework of the process for the secure application 280 to be replaced with a corresponding proxy. In one arrangement, the replaced conventional variables can correspond to system services that are available to the secure application 280. For example, any number of well-known application programming interfaces (API) that are related to system services can be parsed and certain variables of these APIs can be replaced with a corresponding proxy. As another example, the variables of the APIs that are replaced may be fields that serve as the binder or interface between the application space of the secure application 280 and the system server 225 or other system process.

Continuing with the example, the corresponding proxy can be an invocation handler that is an object of the same type as the replaced field, and the invocation handler can be a generic object that can implement all or at least a substantial portion of the classes of the operating system of the computing device 125. As part of this configuration, the invocation handler can process various methods and can provide a single method of invoke. Moreover, the invocation handler encapsulates the replaced field, and the invocation handler is integrated into the application process for the secure application 280. As such, the corresponding proxy can be considered a different instance of the replaced field and, as will be explained below, can enable the decoration of the affected API calls and their delivery to the system server 225.

As can be seen, this process can enable runtime hooks to be implemented for the APIs of the secure application 280. Any number of the system services may be targeted during this step, including all of them or only a portion thereof. Once the initial relevant classes have been loaded and the runtime hooks have been set, the override class loader may selectively defer to the application class. In view of this selective deferment, there are some instances where the override class loader may load other classes from the core application 285 during runtime in place of system classes. As will be explained below, the classes loaded by the override class loader may facilitate the modification or decoration of calls from the secure application 280. Additional information on the override class loader and its operation can be found in U.S. Patent Application No. 61/936,378, filed on Feb. 6, 2014, which is incorporated herein by reference.

Referring back to the method 500, during runtime of the secure application, a conventional request from the secure application can be intercepted, as shown at step 520. At step 525, the intercepted conventional request can be modified such that the request is unrecognizable to an unsecure application, thereby creating a secure request. At step 530, the secure request can be passed to a system process to enable the system process to process the secure request. In response to the secure request, a secure return may be received from the system process, as shown at step 535. At step 540, the secure return may then be converted to a conventional return, and the conventional return can be passed to the secure application for processing by the secure application, as shown at step 545.

Referring to FIGS. 6 and 7, examples of this process will be presented. In the first example, which is illustrated in FIG. 6, a user may have initiated a secure application 280 and may wish to share some type of content, such as with another secure application 280. In the second example, which is shown in FIG. 7, a user may wish to copy some content from a secure application 280 and paste that content in the same secure application 280, although such content may be pasted in a different secure application.

Referring to FIG. 6, a representation of a message exchange between a secure application 280, an application framework 605, a secure framework 230 and a system server 225 is illustrated. In this example, the secure application 280, the application framework 605 and the secure framework 230 may be considered to be part of an application process 610. In addition, the system server 225 may be part of a system process 615, a process that is separate from the application process 610.

In this example, as previously noted, the user may wish to share some content from the secure application 280. Accordingly, a conventional request may be generated by the secure application 280, which normally would be facilitated by the application framework 605. A conventional request, in this context, is simply a request that conforms with a normal request for a system service and has not yet been decorated or modified. In view of the runtime hooks, the conventional request can be intercepted and directed to the secure framework 230, which can modify or decorate the conventional request. This decoration can convert the conventional request into a secure request, which can conform to a predetermined secure namespacing scheme. For example, the relevant component of the conventional request may be appended with an affix or some other morpheme or any number of characters to create the secure request. At this point, only applications that are privy to the secure namespacing scheme, such as the secure applications 280, may be able to respond to the secure request. Accordingly, these communications may be modified such that they are obfuscated from or unrecognizable by unsecure applications.

Once the secure request is created, the secure framework 230 can make the same API call to the encapsulated field, thereby sending the secure request to the application framework 605. The application framework 605 can then send the secure request across to the system server 225, which can process the secure request. For example, one or more other secure applications 280 may have previously declared certain component filters in their manifests that would enable them to respond to the secure request for sharing content. As such, the system server 225 can send to the secure framework 230 a secure return that is related to the secure applications 280 that can handle the request.

As an option, the secure framework 230 can convert the secure return to a conventional return or can perform additional filtering or other steps. In one arrangement, the secure return can be converted to a conventional return by removing the appended affix from the secure return, a process that may also be referred to as undecorating. The secure framework 230 can pass the conventional return to the application framework 605, which can send it to the secure application 280 for processing. As an example, if more than one secure application 280 can handle the request, a chooser dialog or some other user interface element can be presented to the user to permit the user to select which secure application 280 should process the request. If the user selects one of the presented secure applications 280, that secure application 280 can launch, and the calls associated with this interaction can be decorated and undecorated as described above, with the secure framework 230 overseeing such manipulation.

Referring to FIG. 7, an exemplary copy and paste operation is presented. In this example, a user may be operating a secure application 280 and may copy some data that is associated with the secure application 280. In view of the description above, the copy call may be intercepted by the secure framework 230, which can modify the call by re-directing it to the core application 285. In response, the core application 285 can store the copied data in a memory element 625, which may be a memory element with restricted access. In one arrangement, the data copied in the memory element 625 can be mapped to enable correlation, which may be helpful if multiple copy operations are permitted in the computing device 125.

In one embodiment, the core application 285 can return a hash of an identifier to the secure framework 230. For example, the identifier can be a timestamp of the current time, although other identifiers may be employed here. The secure framework 230 can then send the hash of the identifier to the encapsulated field or interface of the application framework 605, which can then send it to the system server 225. The system server 225 can then copy the hash of the identifier in a memory element 620, in accordance with standard operating procedure for a copy API. Thus, the copy request may be modified because the true data intended to be copied is intercepted and replaced with a hash of an identifier. Moreover, the request is unrecognizable by an unsecure application 275 because an unsecure application 275 that attempts a paste operation will be returned the hash of the identifier, not the data from the secure application 280. Accordingly, the request can be decorated in ways that are different from appending the components, as described above.

At a later time, the user may wish to perform a paste operation, either from the same secure application 280 from where the copy feature was initiated or a different secure application 280. In this example, the paste originates from the secure application 280 that initiated the corresponding copy operation.

Here, the paste operation can be intercepted by the secure framework 230 and can be directed to the application framework 605, which can send the paste call to the system server 225. The system server 225 can retrieve the hash of the identifier from the memory element 620 and can return it to the secure framework 230. In response, the secure framework 230 can return the hash of the identifier to the core application 285, which can then retrieve the actual copied data from the memory element 625. Subsequently, the core application 285 can return the actual copied data to the secure framework 230, which can then pass the data to the application framework 605. At this point, the application framework 605 can return the data to the secure application 280 to complete the paste operation.

As noted earlier, there are certain system services that may be hooked to render the affected communications or operations taking place from being recognizable by unauthorized processes, such as unsecure applications. While many well-known API calls may be targeted in this scheme, some system services may be unaffected. That is, this process may apply to only certain calls to and from the secure application 280, while the remaining ones are permitted to proceed in conventional fashion.

As previously mentioned, the computing device 125 may include both secure applications 280 and unsecure applications 275. As has been shown here, steps may be taken to protect data or content requests originating from a secure application 280 from being processed or otherwise handled by an unsecure application 275. Nonetheless, there may be some instances in which content may be permitted to be exchanged between unsecure applications 275 and secure applications 280. Examples of these instances will be presented below.

In view of such content exchange, steps may be taken to avoid confusion in the delivery or acquirement of the requested data. In particular, the computing device 125 may include a secure application 280 and an unsecure application 275 that are the same type of applications. For example, the computing device 125 may have an unsecure version of a picture gallery that includes personal pictures of the user of the device 125 and a separate and secure version of a picture gallery that contains pictures associated with the user's employer or some other entity. In this case, the pictures from the secure gallery may be encrypted and not meant to be accessed without user authentication. As another example, the computing device 125 may include both secure and unsecure versions of an application that stores and manages documents stored at a remote location. Even though the content requests associated with the secure version of an application may be isolated from the unsecure version of the application, steps may need to be taken to minimize or prevent comingling of the content that is the subject of such content requests.

Consider the example where the computing device 125 includes a secure picture gallery and an unsecure picture gallery. If a user is interacting with a secure application 280 and wishes to attach a picture from the unsecure picture gallery (i.e., unsecure application), a process may be implemented to ensure that the selected content is pulled from the unsecure picture gallery instead of the secure picture gallery. This process can distinguish content requests associated with unsecure applications from those involving secure applications. As part of these scheme, steps may also be taken to ensure that protected or secure content is still kept from being received by unsecure applications or other unauthorized processes. Several examples illustrating this feature will be presented below.

Figure 8:
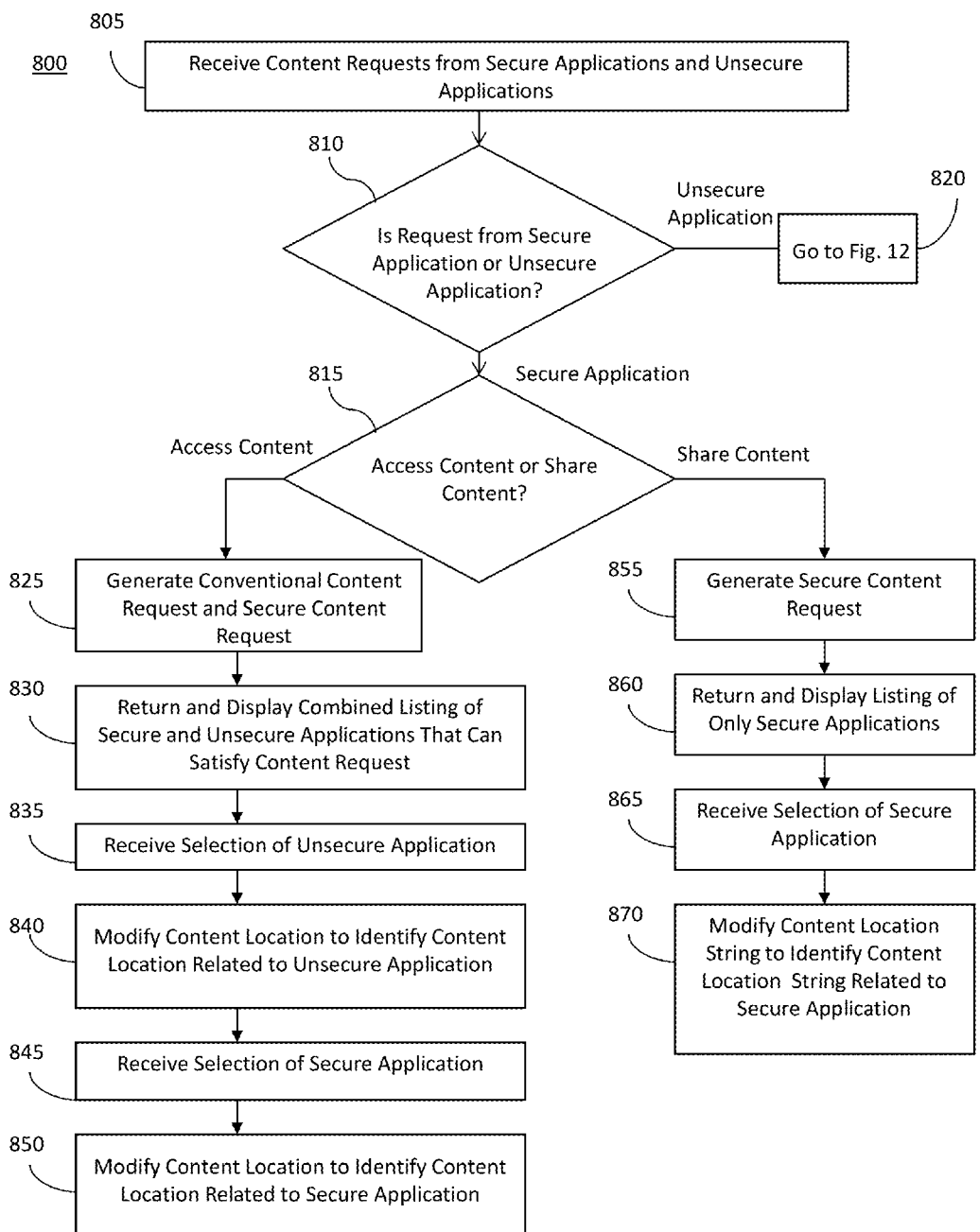
FIG. 8 illustrates an example of a method of enabling the exchange of content between secure applications and unsecure applications.
Figure 9:
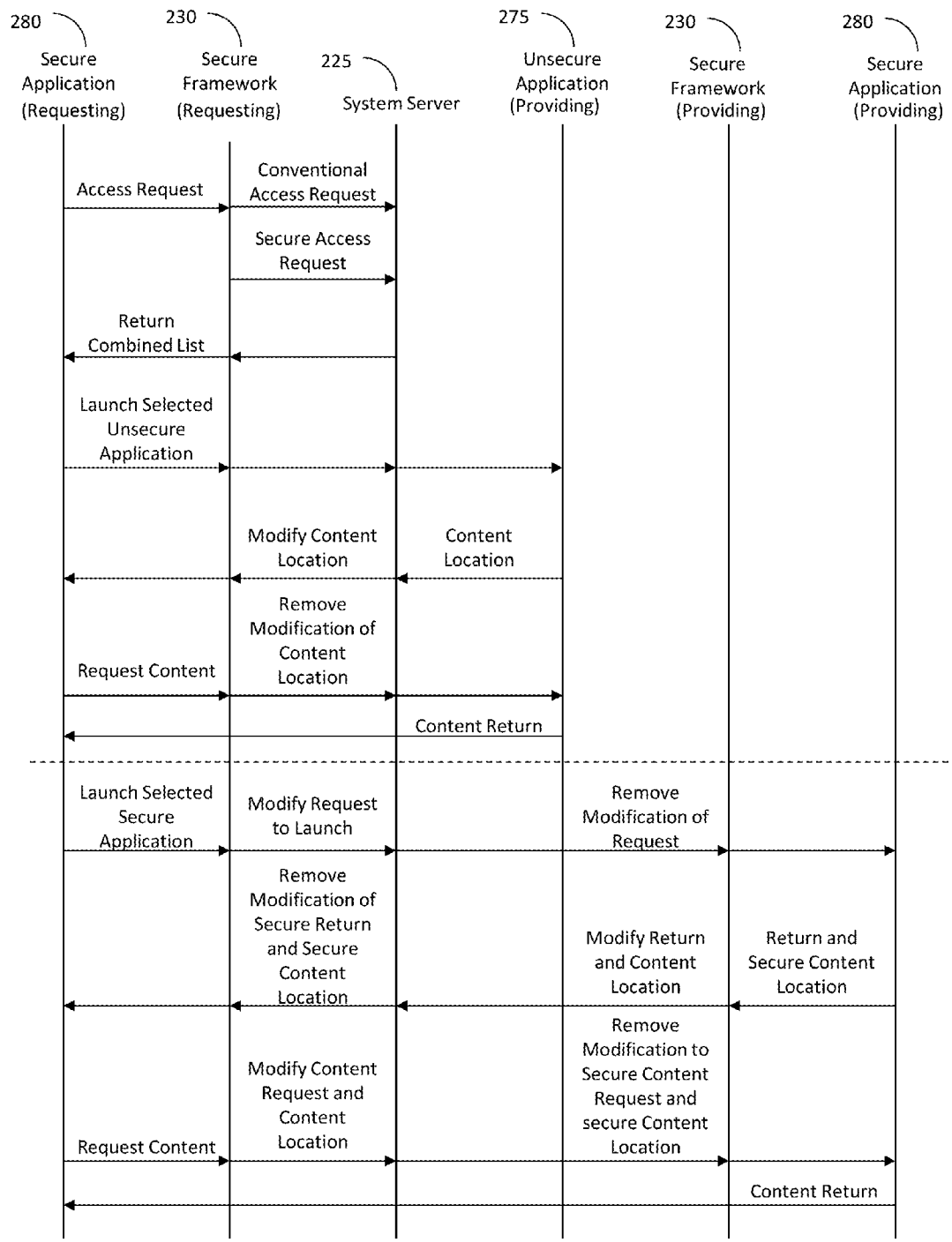
FIG. 9 illustrates an example of a signal-flow diagram between a secure application accessing content and a providing unsecure application.
Figure 10:
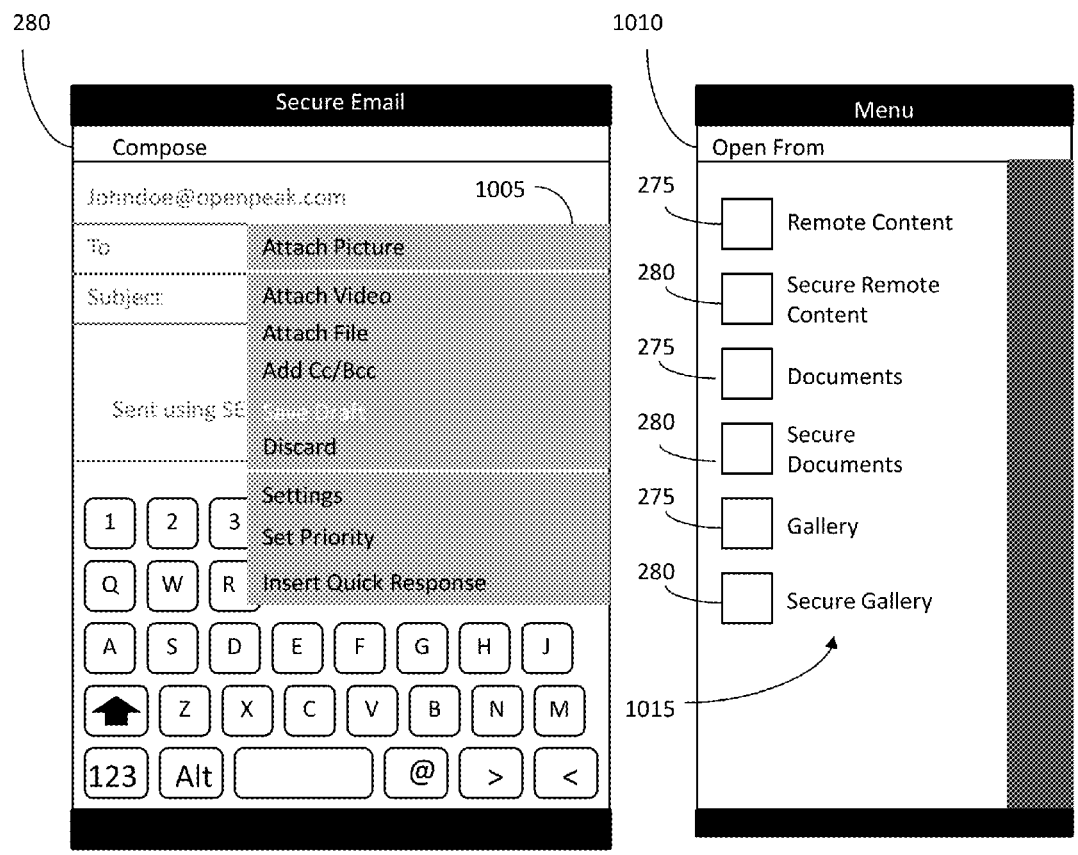
FIG. 10 illustrates an example of a user interface that shows a combined listing of secure applications and unsecure applications in response to a request to access content.

Referring to FIG. 8, a method 800 of enabling the exchange of content between secure applications and unsecure applications is shown. The method 800 may include additional or even fewer steps or processes in comparison to what is illustrated in FIG. 8. Moreover, the method 800 is not necessarily limited to the chronological order that is shown in FIG. 8. In describing the method 800, reference may be made to FIGS. 1-7, although it is understood that the method 800 may be practiced with any other suitable systems and components and may take advantage of other suitable processes. Reference may also be made to FIGS. 9 and 10, which show examples of message exchange between applications, to help explain the method 800.

At step 805, content requests can be received from secure applications and unsecure applications. At decision block 810, it can be determined whether a particular request is from a secure application or an unsecure application. If the request is from a secure application, the method 800 can continue to decision block 815. If the request is from an unsecure application, the method can continue to step 820, which moves the flow to FIG. 12. A description related to FIG. 12 will appear below.

Returning to decision block 815, it can be determined whether the content request is a request to access content or to share content. If the request is to access content, the method 800 can continue at step 825, and if the request is to share content, the method 800 can continue at step 855. Turning to step 825, a conventional content request and a secure content request can be generated in response to the request to access content. At step 830, a combined listing of secure and unsecure applications that can satisfy the request to access content can be returned and displayed. A selection of, for example, an unsecure application may be received, as shown at step 835. At step 840, a content location can be modified to identify the content location as being associated with an unsecure application. At step 845, a selection of a secure application can be received, and a content location can be modified to identify the content location as being associated with a secure application, as shown at step 850.

An example of the process described above will now be presented, with reference being made to FIG. 9. In FIG. 9, a signal flow 900 between a requesting secure application 280 and a providing secure application 280 and a providing unsecure application 275 is shown. A system server 225 and instantiations or portions of a secure framework 230 for the requesting secure application 280 and the providing secure application 280 are also shown. To be clear, this signal flow 900 represents an example of a secure application 280 generating a request to access content. Moreover, in this example, the concept of intercepting and modifying conventional requests to convert them to secure requests—a process that was described above—applies here.

Initially, a user may be interacting with a secure application 280, and the user may wish to access content through this secure application 280. As such, in this case, the content request is a request to retrieve or access content, and the secure application 280 may be referred to as a requesting secure application 280. In one arrangement, secure applications 280 may be permitted to access content from other secure applications 280 and even unsecure applications 275. That is, the ability to retrieve unsecure content outside the secure workspace 295 or other secure environment of the computing device 125 may be allowed because such a step does not violate the principle of keeping secure content from being disseminated outside the secure workspace 295 or the secure environment.

A secure application 280 that may be able to provide content in response to the request from the requesting secure application 280 may be referred to as a providing secure application 280. Moreover, to minimize confusion, the instantiation or potion of the secure framework 230 that is attached to the requesting secure application 280 may be referred to as a requesting secure framework 230. Conversely, the secure framework 230 associated with the providing secure application 280 may be called a providing secure framework 230. The use of the modifiers "requesting" and "providing" should not be construed as limiting the secure applications 280 and the secure frameworks 230 to which they are attached. That is, the roles of these secure applications 280 and secure frameworks 230 may change depending on the type of operation being executed.

To accomplish the task of possibly retrieving content from both secure applications 280 and unsecure applications 275, the content request may be comprised of two requests: a secure request to access content from secure applications 280 and a conventional request to access content from unsecure applications 275. For example, the requesting secure application 280 may generate a request to access content, which the requesting secure framework 230 can intercept. The requesting secure framework 230 can then convert the intercepted request to a secure content request, in accordance with the process previously described. The requesting secure framework 230 can then pass the secure content request to the system server 225. In addition, the requesting secure framework 230 can pass the content request as is (i.e., the conventional request to access content) to the system server 225. In one particular example, these requests may be intents, although other suitable abstract operational identifiers may apply here, including for any of the other actions presented herein.

An unsecure application 275 that is installed on the computing device 125 may register with the system server 225 (or some other component) to indicate to the system server 225 that the unsecure application 275 is capable of handling certain requests from other applications. Thus, when the conventional content request is passed to the system server 225, the system server 225 can determine which unsecure applications 275 have the ability to satisfy the conventional content request. Secure applications 280, when installed, may also register with the system server 225 (or other suitable component) to enable the system server 225 to determine which providing secure applications 280 are capable of supporting the secure content request. In view of the secure namespacing scheme described earlier, the unsecure applications 275 are prevented from responding to the secure content request.

Once the system server determines which unsecure applications 275 and which providing secure applications 280 have the ability to satisfy (respectively) the conventional content request and the secure content request, the system server 225 can return a combined listing of them to the requesting secure framework 230, which can return the combined listing to the requesting secure application 280. The returned unsecure applications 275 and providing secure applications 280 may be displayed to the user in any suitable format to enable the user to make one or more selections. An example of such a presentation is shown in FIG. 10.

In FIG. 10, a secure application 280, such as a secure email application, is shown in which a user wishes to attach some form of content to the secure application 280. A menu 1005 is pictured that presents several options to retrieve or access content for the user to choose. Depending on which option is selected, another menu 1010 can be displayed that presents a combined listing 1015 of options that have the ability to satisfy the request to retrieve or access content, such as both secure applications 280 and unsecure applications 275 that can handle the request. Various schemes, such as text or icon designs, can be structured to enable the user to distinguish between secure applications 280 and unsecure applications 275, particularly when such applications are different versions of the same application (e.g., secure gallery versus unsecure gallery). At this point, the user, while interacting with a requesting secure application 280, can retrieve content from either a providing secure application 280 or a providing unsecure application 275 without violating the principle of isolating secure or protected content from the unsecure applications 275.

In this example, the user may select a providing unsecure application 275 through the menu 1010 to access some desired content. Turning to FIG. 9 again, the requesting secure application 280 can generate a request to launch the selected unsecure application 275. In this case, because the request involves an unsecure application 275, the request to launch the unsecure application 275 should not be modified. This request is eventually passed to the unsecure application 275, which can then be launched. The user may then select the content that the user wishes to access from the unsecure application 275.

Once the content is selected, the unsecure application 275 can generate a return that includes, for example, a content location that can provide data as to where the selected content is located on the computing device 125 (or even a remote location). In one embodiment, the content location may be a uniform resource identifier (URI) or some other string of characters that indicate where the related content is located, either on the computing device 125 or some remote location. The generated return and the content location can be passed to the requesting secure framework 230, which can be configured to modify the content location. For example, a character can be appended to the content location that can identify the content location as being associated with an unsecure application 275. The modified content location can then be returned to the requesting secure application 280. With this return, the requesting secure application 280 may eventually seek to retrieve the content associated with the modified content location, as will be explained later.

The object that is modified at this stage is not necessarily limited to a content location. Specifically, any part of the return from the unsecure application 275 may be modified in any suitable way to identify the return as being associated with an unsecure application 275. Moreover, the content location may not necessarily be associated with a single location. For example, the content location may comprise multiple locations such that the portions of the requested content are stored in numerous separate areas.

Once it receives the return with the modified content location, the requesting secure application 280 may generate a request for the actual content related to the modified content location. For example, referring to the secure email application of FIG. 10, the user may have taken action to cause an email to which the access content is to be attached to be delivered to its intended destination. The requesting secure application 280 can pass the content request along with the modified content location to the requesting secure framework 230. The requesting secure framework 230 can recognize the modified content location as being associated with an unsecure application 275. As such, the requesting secure framework 230 can make a distinction between the relevant unsecure application 275 and a potential providing secure application 280 that is a secure version of the relevant unsecure application 275. For example, if the computing device includes an unsecure picture gallery and a secure picture gallery, the modified content location from the requesting secure application 280 enables the requesting secure framework 230 to determine that the request is to be directed to the unsecure picture gallery. Thus, this model enables content requests to be properly directed in the case of secure and unsecure versions of the same application.

In one embodiment, the requesting secure framework 230 can remove the modification of the content location such that the content location can be in its original form. As an example, this arrangement can be done by stripping out the character appended to the URI. In an alternative embodiment, the original character that was added to modify the URI can be replaced with another character, and this replacement scheme may apply to any of the exchanges described herein. In either event, because the content request is to be directed to an unsecure application 275, there is no need to modify the content request itself. The content request (and the original content locations) can be passed to the unsecure application 275. The unsecure application 275, because it is dealing with an unmodified content request and content location, can process the request in a conventional manner, eventually returning the requested content to the requesting secure application 280.

As noted earlier, the user may select a providing secure application 280 from the menu 1010 of FIG. 10, instead of an unsecure application 275. The signal flow associated with this selection will also be presented in FIG. 9, and the dashed horizontal line separates the first content request directed to the unsecure application 275 discussed above from the second content request that seeks content from the providing secure application 280. Because the initial steps of this second example may be the same as already presented with respect to the first example, this description can begin at the point where the user has selected a providing secure application 280.

Once a providing secure application 280 is selected, the requesting secure application 280 can generate a request to have the providing secure application 280 launch, which the requesting secure framework 230 can intercept. Because a secure application 280 was selected, the requesting secure framework 230 can modify the request to launch the providing secure application 280 to obfuscate or hide the request from any unauthorized processes, such as unsecure applications 275. The requesting secure framework 230 can then pass the modified request to the system server 225, which can send the request to the providing secure framework 230. In response, the providing secure framework 230 can remove the modification to the request and can pass the unmodified request to the providing secure application 280, which can be launched.

At this point, the user may select some content from the providing secure application 280, and the providing secure application 280 may generate a return in response to the selection and send the return to the providing secure framework 230. This return may include a content location that can identify the location of the requested content. Like the example above, the content location in this illustration can be a URI.

The providing secure framework 230 can intercept and modify the request to hide it from the unsecure applications 275. As part of this step, the providing secure framework 230 can also modify the content location, which can identify it as being associated with a secure application 280. For example, the providing secure framework 230 can append the URI from the providing secure application 280 with some character that can serve as a signal for such identification. This character may be in a different form from that of the character assigned for unsecure applications 275 to assist in the distinction between the unsecure applications 275 and the secure applications 280. Because the content return and the content location (and URI) in this example are associated with a secure application 280, they may be respectively referred to as a secure content return and a secure content location (and secure URI) upon their modification by the providing secure framework 230.

The providing secure framework 230 can then pass the secure (modified) content return and the secure (modified) content location to the system server 225, which can forward the (modified) secure return and secure content location to the requesting secure framework 230. In one arrangement, the requesting secure framework 230 can remove the modification from the secure return and the secure content location that is part of the return. The requesting secure framework 230 can send the conventional (unmodified) return and content location to the requesting secure application 280.

Subsequently, the requesting secure application 280 may generate a request to access the content associated with the (unmodified) content location, which can be intercepted by the requesting secure framework 230. The requesting secure framework 230 can convert the content request into a secure content request and can modify the content location, in accordance with prior examples and description. In one arrangement, the requesting secure framework 230 can be set to default to a secure version of an application when it receives an unmodified content location from a requesting secure application 280. In other words, the requesting secure framework 230 can determine on a default basis that an unmodified content location from a first secure application is associated with content from a second secure application 280.

The requesting secure framework 230 can then pass the (modified) secure request and (modified) secure content location to the system server 225. The system server 225 can send the secure request and secure content location to the providing secure framework 230, which can remove the modifications. The providing secure framework 230 can then pass the unmodified request and unmodified content location to the providing secure application 280. The providing secure application 280 can then return the requested content to the requesting secure application 280.

In some embodiments, the content that is to be returned from the providing secure application 280 may be encrypted. In such cases, the providing secure application 280 can decrypt this content prior to it being sent to the requesting secure application 280. The requesting secure application 280 may then re-encrypt the content with its own key(s) prior to sending out such content. Of course, the returned content may also stay in its encrypted state during its transfer to the requesting secure application 280. In another arrangement, the secure applications 280 may be configured to share encryption keys, if such an arrangement is desired. In either case, the encryption unit 262 (see FIG. 2) may support any encryption/decryption that may be needed.

As can be seen, an exemplary system/method is provided in which modifications may be selectively made to ensure inter-process communications between secure applications 280 are kept secure and to facilitate the distinction between content locations associated with secure applications and their corresponding unsecure versions (i.e., unsecure applications). That is, tagging the content locations associated with an unsecure application and leaving such modifications in place upon presentation to the requesting secure application 280 can ensure that the requesting secure framework 230 can determine that it is dealing with a content request from an unsecure application 275. The modifications to the content locations associated with secure applications may be removed before being presented to the requesting secure application 280. This step can be performed because unmodified content locations from a secure application may be assumed to be associated with another secure application 280. Although in contrast to the treatment of a content location associated with an unsecure application 275, this process can minimize the operational/structural changes required for secure applications 280.

In an alternative arrangement, however, the content location associated with secure applications 280 may remain modified when presented to a requesting secure application 280 (i.e., it may not be necessary to remove the modification prior to it being passed to the requesting secure application). In yet another arrangement, the content locations associated with secure applications 280 may remain modified for presentation to the requesting secure application 280, and the content locations associated with unsecure applications 275 may be unmodified prior to such presentation. In other words, the system can—on a default basis—determine that an unmodified content location from a secure application 280 is from an unsecure application 275.

Although a combined listing of secure applications 280 and unsecure applications 275 may be presented to a user for convenience, such an arrangement is not a necessity. For example, separate listings for secure applications 280 and unsecure applications 275 may be returned and displayed to the user. Moreover, some content requests may be answered in an explicit manner such that a single secure application 280 or unsecure application 275 may be presented in response to a content request for a particular secure application 280 or unsecure application 275. Also, even though the description above notes that content locations associated with both secure applications 280 and unsecure applications 275 may be modified to indicate their association with such versions, such an arrangement is not meant to be limiting. For example, only the content locations associated with the unsecure applications 275 may be modified, and those of the secure applications 280 may remain unaltered during the content exchange process. In another example, only the secure content locations may be modified in accordance with the description above, and those of the unsecure applications 275 may not need to be modified. Although described in reference to a process of accessing content, these alternative arrangements may apply to other operations, including those involved with secure applications 280, unsecure applications 275 or both.

Referring once again to FIG. 8, the next portion of the method 800 will focus on a secure application 280 seeking to share content. At step 855, a secure content request can be generated, and at step 860, a listing of only secure applications may be returned and displayed. At step 865, a selection of a secure application may be received. A content location can be modified to identify the content location as being associated with a secure application, as shown in step 870.

Figure 11:
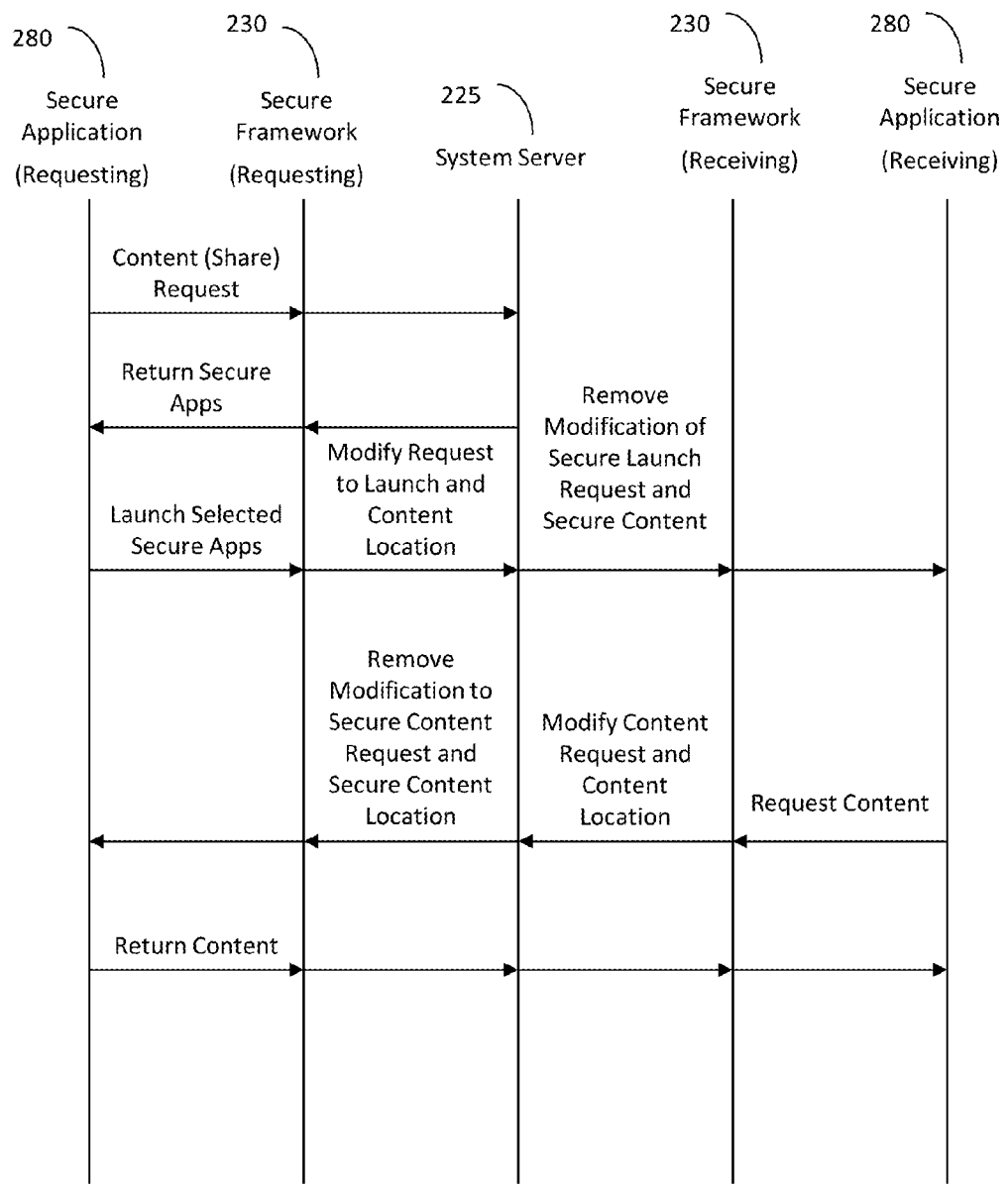
FIG. 11 illustrates an example of a signal-flow diagram between a secure application sharing content and a receiving secure application.

Referring to FIG. 11, an exemplary signal-flow diagram 1100 is shown. In this example, a user may be interacting with a secure application 280 and may wish to share some content from the secure application 280. The secure application 280 in this example may also be referred to as a requesting secure application 280, as it is generating a request to share content. As also shown in the signal-flow diagram 1100, a requesting secure framework 230, a system server 225, a receiving secure framework 230 and a receiving secure application 280 may facilitate this exchange.

In response to the user's actions, the requesting secure application 280 can generate a content request, and the requesting secure framework 230 can intercept and modify the content request. In accordance with prior descriptions herein, this step can convert the content request into a secure content request. The requesting secure framework 230 can then pass the secure content request to the system server 225. In response, the system server 225 may return one or more receiving secure applications 280 that may be able to process the request (i.e., receive the content). Because the content request is a secure content request, the system server 225 may only return receiving secure applications 280, as the unsecure applications 275 should not be registered for secure content requests. Similar to the description presented in FIG. 10, the receiving secure applications 280 that can handle the content request may be displayed to the user, such as through a menu.

The user may then select one of the secure applications 280 to receive the content, and the requesting secure application 280 can generate a request to have the selected receiving secure application 280 launch. The requesting secure framework 230 can intercept the launch request and can convert it into a secure launch request. The secure launch request may also include a content location that identifies the location of the content to be shared with the receiving secure application 280. Because the content to be shared is from a secure application 280, the requesting secure framework 230 can also modify the content location (e.g., a character may be appended to the URI) to convert it to a secure content location. The requesting secure framework 230 can then pass the secure launch request (and the secure content location) to the system server 225, which can forward it to the receiving secure framework 230. The receiving secure framework 230 can remove the modifications to the secure request and content location and can pass them to the receiving secure application 280. The receiving secure application 280 may then be launched.

Eventually, the receiving secure application 280 may generate a request for the content, which may be intercepted and modified by the receiving secure framework 230. The content location may also be modified by the receiving secure framework 230 to indicate that it is associated with a secure application 280. The receiving secure framework 230 can then pass the secure content request and the secure content location to the system server 225, which can send it to the requesting secure framework 230. In response, the requesting secure framework 230 can remove the modifications to the secure content request and the secure content location and can return them to the requesting secure application 280. At this point, the requesting secure application 280 can return the requested content to the receiving secure application 280. Like the example above, the returned content may be decrypted prior to delivery to the receiving secure application 280 or may remain encrypted during this stage. If decrypted, the receiving secure application 280 may re-encrypt the returned content.

Figure 12:
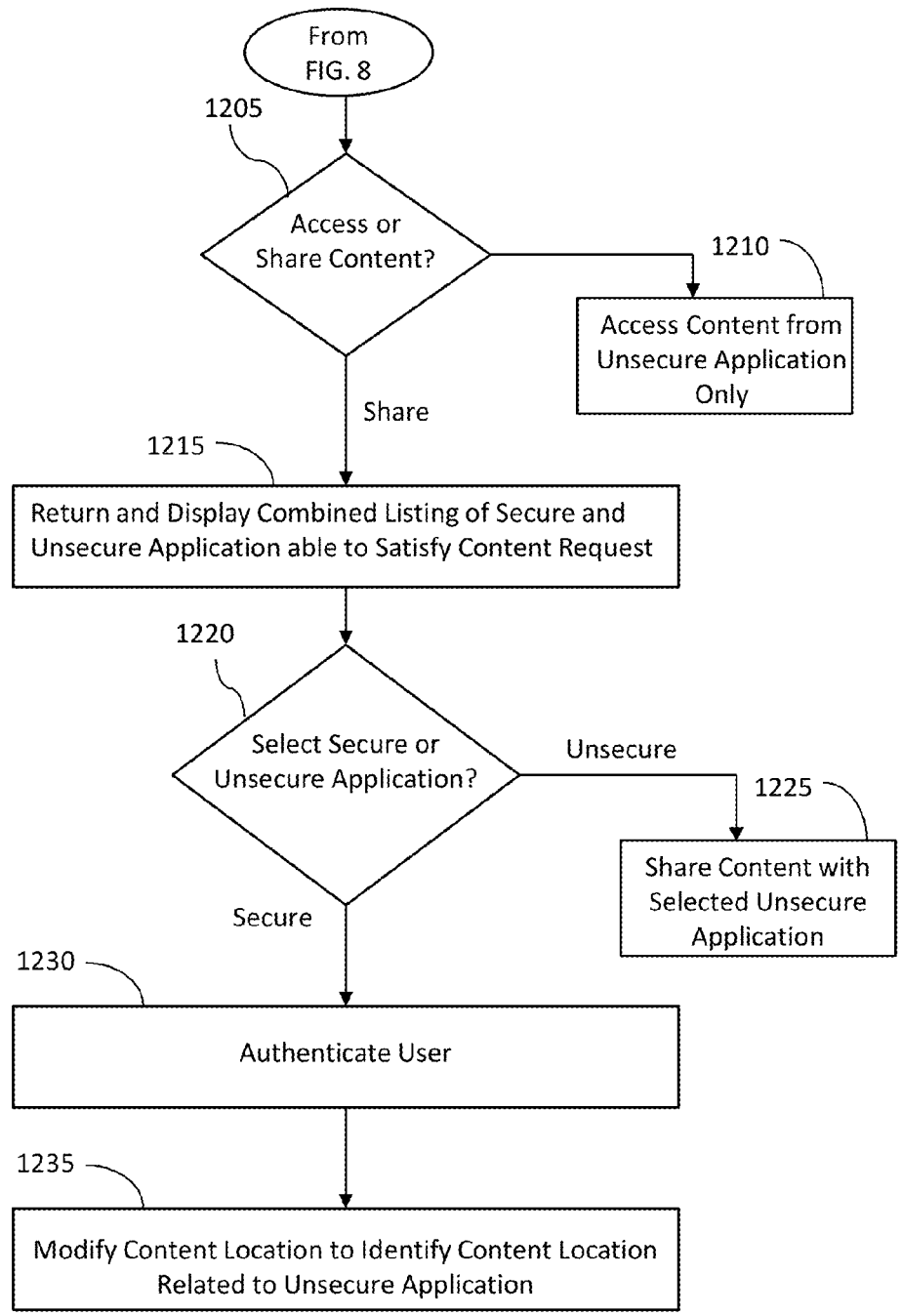
FIG. 12 illustrates an example of a method enabling the exchange of content between unsecure applications and secure applications.
Figure 13:
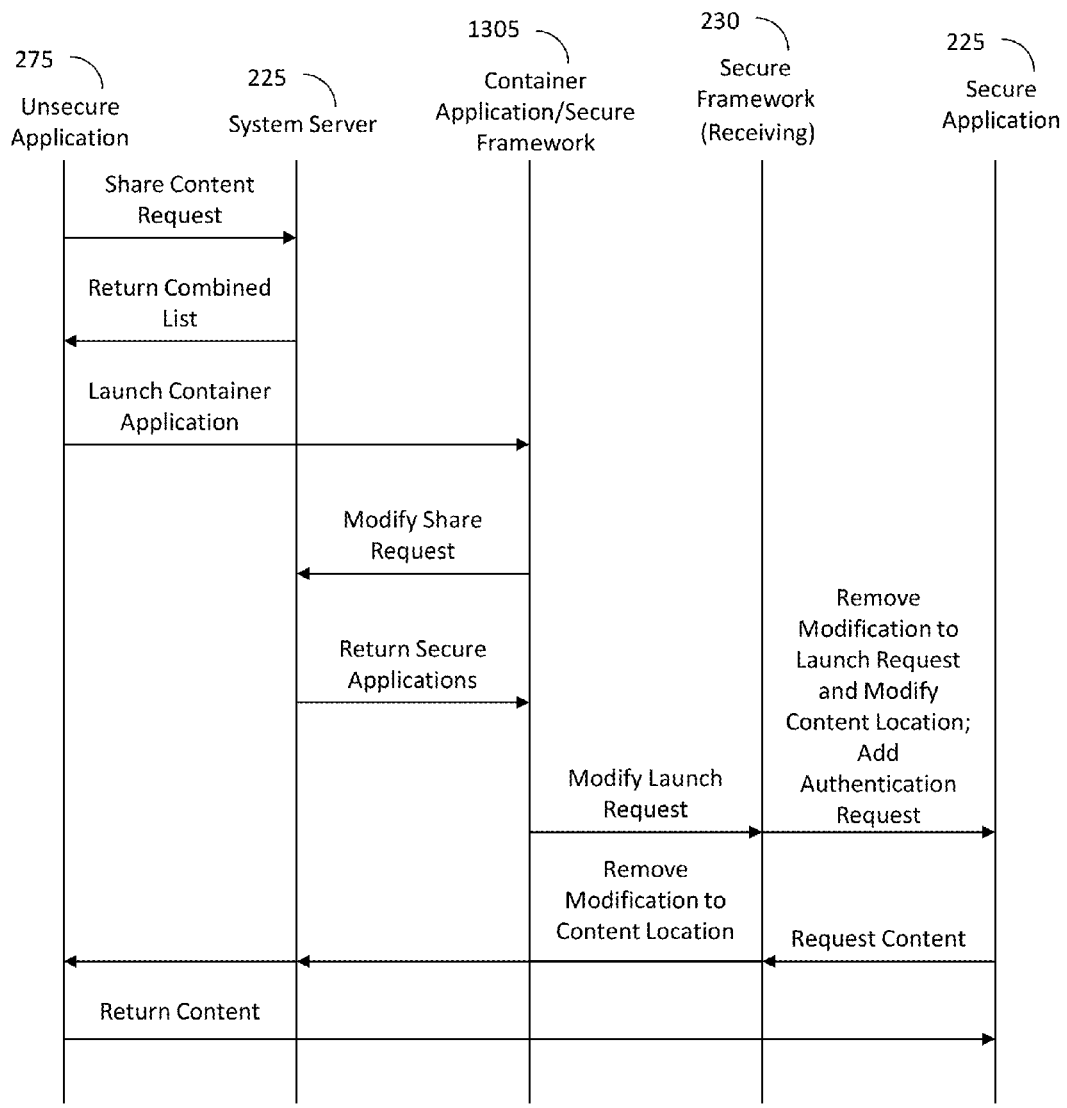
FIG. 13 illustrates an example of a signal-flow diagram between an unsecure application sharing content and a receiving secure application.
Figure 14:
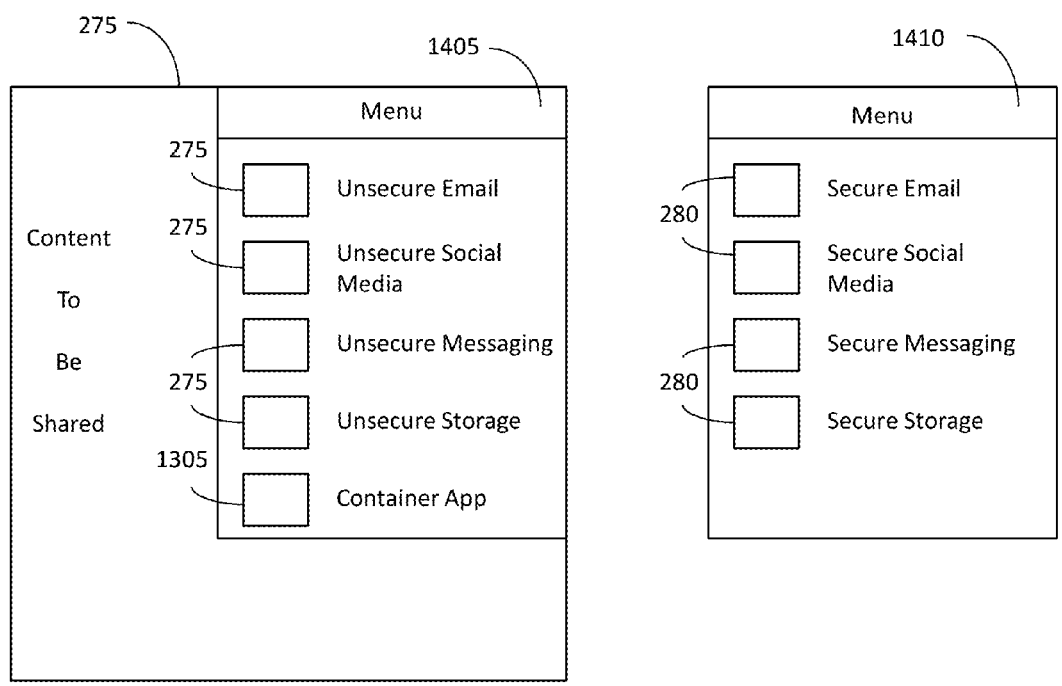
FIG. 14 illustrates an example of a user interface that shows a combined listing of unsecure applications and secure applications in response to a request to share content.

Referring back to FIG. 8, at decision block 810, if a content request is from an unsecure application, then the method 800 can continue to step 820, which can jump to FIG. 12. Turning to FIG. 12, a method 1200 is shown in which an exemplary content request from an unsecure application is performed. Like previous descriptions, the method 1200 may include additional or even fewer steps or processes in comparison to what is illustrated in FIG. 12. Moreover, the method 1200 is not necessarily limited to the chronological order that is shown in FIG. 12. In describing the method 1200, reference may be made to FIGS. 1-11, although it is understood that the method 1200 may be practiced with any other suitable systems and components and may take advantage of other suitable processes. Reference may also be made to FIGS. 13 and 14, which show examples of message exchange between applications, to help explain the method 1200.

At decision block 1205, it can be determined whether the content request is to access content or to share content. If the request is to access content, the method 800 can continue to step 1210, where content can be accessed from unsecure applications only.

As an example, a user of the computing device 125 may be interacting with an unsecure application 275, and the user may wish to access some content from another application or share content from the unsecure application 275 with some other application. If the content request is to access content from another application, then the unsecure application 275 can generate a content request that can be processed by the system server 225. Because the content request is coming from an unsecure application 275, the content request may be in its conventional form, or not in a modified state to prevent it from being hidden from other unsecure applications 275. The system sever 225 can then return any number of unsecure applications 275 that can respond to the request to access the content. No secure applications 280, however, should be returned in response to this request to access content because secure applications 280 in this setting are generally (or completely) barred from sharing such content with unsecure applications 275.

In contrast, if the content request is a request to share data from an unsecure application 275, secure applications 280 may be permitted to accept such content from the unsecure application 275. Returning to FIG. 12, at decision block 1205, if the content request is to share content, the method 1200 can continue at step 1215. At step 1215, a combined listing of secure and unsecure applications that are able to satisfy the sharing content request can be returned and displayed. At decision block 1220, it can be determined whether a secure application or an unsecure application is selected. If an unsecure application is selected, the content can be shared with that unsecure application, as shown at step 1225. If, however, a secure application is selected, the user may be authenticated, as shown at step 1230. In addition, a content location may be modified to indicate that the content location is related to an unsecure application, as shown at step 1235.

To help explain this process, reference will be made to FIG. 13, which illustrates a signal-flow diagram 1300. The signal-flow diagram 1300 is an example of an unsecure application 275 sharing content with a secure application 280. Once the user selects an action to share the relevant content from the unsecure application 275, the unsecure application 275 may generate a share content request, which can be passed to the system server 225. In this case, the share content request should not be modified—as when dealing with secure applications 280—because the request originates from the unsecure application 275. In response, the system server 225 can return a listing of components that are able to process the share request. The listing of components can include one or more unsecure applications 275 and one or more secure applications 280.

In one arrangement, the secure application 280 that is returned can be a container application 1305. The container application 1305 may be an application that enables a user to switch from the personal (unsecure) workspace 297 to the secure workspace 295. Even though the container application 1305 may be considered a secure application 280, it may be registered with the system server 225 as an unsecure application 275 that is capable of handling certain requests from unsecure applications 275.

Continuing with the example, whichever unsecure applications 275 and secure applications 280 are returned can be displayed to the user. For example, referring to FIG. 14, an unsecure application 275 with which the user is interacting is shown, and the user may wish to share some content from this unsecure application 275. A menu 1405 may present the available options to the user, which can, in this example, include multiple other unsecure applications 275 and the container application 1305. Either one of these options may be selected for sharing the relevant content.

Referring back to FIG. 13, if the user selects an unsecure application 275, the content can be shared with the selected unsecure application 275, and no modifications to the exchanges between the unsecure applications 275 and the system server 225 are necessary. That is, conventional message exchanges may be performed here. If the user selects the container application 1305, the initial request to launch the container application 1305 may remain unmodified, and the container application 1305 may launch. The secure framework 230 of the container application 1305, however, may intercept and modify the content request originating from the container application 1305 such that only secure applications 280 may be returned for servicing the share content request. The system server 225 can then return the secure applications 280 that can process the share request. Turning back to FIG. 14, an example of a menu 1410 is shown that reflects the returned secure applications 280 that may be able to receive the content that the user wishes to share. The user may select any one of these secure applications 280 for purposes of having the content from the unsecure application 275 delivered to that selected secure application 280.

Moving back to FIG. 13, once the user selects a secure application 280 for receiving the content from the unsecure application 275, the container application 1305 can generate a request to have that secure application 280 launch. The secure framework 230 attached to the container application 1305 can intercept and modify this request, as the message exchange here involves secure applications 280. The modified launch request may also have the content location associated with the content to be shared from the unsecure application 275. As an example, this content location may remain unmodified at this point.

When the receiving secure framework 230 receives this exchange, it may remove the modification from the launch request and may modify the content location. As before, the modification of the content location may involve appending a URI with some identifier to indicate that the modified content location is associated with an unsecure application 275. The receiving secure framework 230 may also cause an authentication request to be presented to the receiving secure application 280. The authentication request can cause the receiving secure application 280 to request some form of authentication from the user, such as a personal identification number (PIN) request screen.

When the receiving secure application 280 launches, the user may be presented with a request for credentials, such as a PIN, and if the user provides the correct response, the receiving secure application 280 may become active. If the user is unable to provide the proper credentials, however, the receiving secure application 280 may abort the launch procedure and shut down.

The receiving secure application 280 may then request the content to be shared, and the receiving secure framework 230 may remove the modification to the content location, as previously described. Because the content request is destined for an unsecure application 275, the content request may not be modified. As with previous cases, the modification of the content location enables the receiving secure framework 230 to distinguish between different versions (secure and unsecure) of the same application. The relevant unsecure application 275, in response to the content request, can return the requested content to the receiving secure application 280. In this example, the content returned to the receiving secure application 280 may not need to be decrypted because the content is originating from an unsecure application 275. The secure application 280, however, may take steps to have the returned content encrypted, particularly before the content is sent outside the secure workspace 290.

One skilled in the art will appreciate that the processes described herein may be under the direction of, facilitated by or at least assisted by one or more of the processing units 250 of FIG. 2. Other circuitry and hardware components of the computing device 125 may also provide such support. For example, the encryption unit 262 may handle the encryption and decryption of the exchanged content, while the authentication unit 264 may facilitate the authentication of the user when using, for example, a secure application 280.

As can be seen, methods and system have been described that enable efficient and selective content exchanges between secure applications and unsecure applications. In particular, a secure application may generate a content request to access or retrieve content, and one or more secure applications and one or more unsecure applications that have the ability to satisfy the request may be returned and displayed to a user of the requesting secure application. Steps can be taken to modify subsequent requests and returns to enable the isolation of secure interprocess communications from unauthorized processes, such as the unsecure applications.

In some cases, there may be secure and unsecure versions of the same application. For example, an unsecure application may be a target application that is converted into a secure application, and both the unsecure application and related or corresponding secure application may be installed on the same computing device. Through the selective modification techniques presented here, the processes in place may be able to distinguish between the unsecure application and the corresponding secure application to ensure the correct content is delivered to the requesting secure application.

In a similar vein, an unsecure application may generate a content request to share content, and any number of secure application and unsecure applications that can process the request may be returned and displayed. If content is to be shared with a secure application, for example, the user may be required to enter some form of credentials. In any event, the principle of protecting secure data or content from unsecure applications or other unauthorized processes may be maintained in this exchange. Further, the modification techniques can ensure that the content to be shared is delivered to the correct version (secure versus unsecure) of application.

While various embodiments have been described above, it should be understood that they have been presented by way of example only, and not limitation. It will be understood by those skilled in the relevant art(s) that various changes in form and details may be made therein without departing from the spirit and scope of the subject matter as defined in the appended claims. Accordingly, the breadth and scope of the present subject matter should not be limited by any of the above-described exemplary embodiments, but should be defined only in accordance with the following claims and their equivalents.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

What is claimed is:

1. A method of enabling the exchange of content between secure applications and unsecure applications, comprising:
   receiving content requests from secure applications and unsecure applications to retrieve content;
   in response to the content requests, returning listings of options that have the ability to satisfy the content requests from the requesting secure applications or the requesting unsecure applications;
   receiving selections of the options of the listings of options through the requesting secure applications or the requesting unsecure applications; and
   selectively modifying content locations that are to be returned to the secure applications such that subsequent content requests that involve the modified content locations are identified as being associated with an unsecure option.

2. The method according to claim 1, wherein the unsecure option is an unsecure application and modifying the content locations that are to be returned comprises appending a character to a uniform resource identifier associated with the unsecure application.

3. The method according to claim 1, wherein some of the content requests are requests to retrieve content for the requesting secure applications or the requesting unsecure applications.

4. The method according to claim 1, wherein if the content request is from a secure application to retrieve content for the requesting secure application, the listing of options includes both secure and unsecure applications that have the ability to satisfy the content request from the requesting secure application.

5. The method according to claim 1, wherein if the content request is from an unsecure application to retrieve content for the requesting unsecure application, the listing of options includes only unsecure applications that have the ability to satisfy the content request from the requesting unsecure application.

6. The method according to claim 1, wherein the content request is a request from a secure application to retrieve content and the method further comprises:
   generating a conventional content request for unsecure options that have the ability to satisfy the conventional content request; and
   generating a secure content request for secure options that have the ability to satisfy the secure content request.

7. The method according to claim 6, wherein returning the listings of options that have the ability to satisfy the content requests comprises returning a combined listing of options that lists the unsecure options that have the ability to satisfy the conventional content request and the secure options that have the ability to satisfy the secure content request.

8. The method according to claim 1, further comprising selectively modifying the content requests from the secure applications and only from the secure applications to ensure that the unsecure applications are prevented from processing such content requests.

9. The method according to claim 1, further comprising modifying content locations that are to be returned to the secure applications and that are associated with a secure option.

10. A method of exchanging content between a secure application and an unsecure application, comprising:
    through a secure application, generating a content request to access content;
    in response to the content request, returning a combined listing that includes at least one secure application and at least one unsecure application, both of which have the ability to respond to the content request;
    receiving a selection of the unsecure application;
    modifying a content location that is to be returned to the secure application from the unsecure application to identify the content location as being associated with an unsecure application.

11. The method according to claim 10, wherein the content request to access content is an intent and the content location is a uniform resource identifier.

12. The method according to claim 11, wherein modifying the content location comprises appending a character to the uniform resource identifier.

13. The method according to claim 10, wherein generating the content request to access content comprises generating a conventional content request to access content from unsecure applications and generating a secure content request to access content from secure applications.

14. The method according to claim 13, wherein the unsecure applications are unable to respond to the secure content request to access content.

15. The method according to claim 10, wherein the secure application and the unsecure application are registered with a system process to indicate to the system process that the secure application and the unsecure application are capable of responding to the content request to access content.

16. The method according to claim 10, wherein the selected unsecure application is installed on a computing device along with a corresponding secure application and the method further comprises distinguishing between the selected unsecure application and the corresponding secure application based on the modified content location.

17. A computing device configured to enable the exchange of content, comprising:
- an interface that is configured to display secure applications and unsecure applications that are installed on the computing device;
- memory that is configured to store data associated with the secure applications and the unsecure applications; and
- a processing unit, wherein the processing unit is configured to:
  - receive a content request to access content, wherein the content request is from a requesting secure application;
  - cause a combined list of one or more other secure applications and one or more unsecure applications to be displayed on the interface;
  - receive a selection of an unsecure applications of the combined list; and
  - cause a content location to be modified such that the modified content location indicates that the modified content location is associated with an unsecure application.

18. The computing device according to claim 17, wherein the content request to access content is an intent and the content location is a uniform resource identifier.

19. The computing device according to claim 18, wherein the processing unit is further configured to cause the content location to be modified by appending a character to the uniform resource identifier.

20. The computing device according to claim 17, wherein the content request to access content is comprised of at least two requests, one of which is a secure request to access content and another of which is an unsecure request to access content, and the processing unit is further configured to:
- cause the unsecure request to be generated such that unsecure applications are capable of responding to the unsecure request; and
- cause the secure request to be generated such that secure applications and only secure applications are capable of responding to the secure request.

21. The computing device according to claim 17, wherein the processing unit is further configured to:
- receive a selection of a secure application of the combined list; and
- cause a second content location to be modified such that the modified second content location indicates that the modified second content location is associated with a secure application.

22. The computing device according to claim 21, wherein the processing unit is further configured to cause the selected secure application to be launched.

23. The computing device according to claim 22, further comprising an encryption unit, wherein the encryption unit is configured to decrypt data that is returned from the selected and launched secure application.

\* \* \* \* \*

UNITED STATES PATENT AND TRADEMARK OFFICE
CERTIFICATE OF CORRECTION

Page 1 of 1

PATENT NO. : 9,098,715 B1
APPLICATION NO. : 14/525932
DATED : August 4, 2015
INVENTOR(S) : Stephen K. Spear, Jr. and Andrew James Dobson It is certified that error appears in the above-identified patent and that said Letters Patent is hereby corrected as shown below:

In the Claims

Column 25, claim 3, lines 61-64, cancel the text beginning with "3. The method according to" and ending with "requesting unsecure applications."; line 65, the claim number reading "4" should read --3--.

Column 26, claim 5, line 4, the claim number reading "5" should read --4--; line 10, the claim number reading "6" should read --5--; line 18, the claim number reading "7" should read --6--; line 18, the claim dependency reading "6" should read --5--; line 24, the claim number reading "8" should read --7--; line 29, the claim number reading "9" should read --8--; line 33, the claim number reading "10" should read --9--; line 46, the claim number reading "11" should read --10-- and the claim dependency reading "10" should read --9--; line 49, the claim number reading "12" should read --11-- and the claim dependency reading "11" should read --10--; line 52, the claim number reading "13" should read --12-- and the claim dependency reading "10" should read --9--; line 57, the claim number reading "14" should read --13-- and the claim dependency reading "13" should read --12--; line 60, the claim number reading "15" should read --14-- and the claim dependency reading "10" should read --9--; line 65, the claim number reading "16" should read --15-- and the claim dependency reading "10" should read --9--.

Column 27, claim 17, line 4, the claim number reading "17" should read --16--; line 24, the claim number reading "18" should read --17-- and the claim dependency reading "17" should read --16--; line 27, the claim number reading "19" should read --18-- and the claim dependency reading "18" should read --17--.

Column 28, claim 20, line 1, the claim number reading "20" should read --19-- and the claim dependency reading "17" should read --16--; line 13, the claim number reading "21" should read --20-- and the claim dependency reading "17" should read --16--; line 22, the claim number reading "22" should read --21-- and the claim dependency reading "21" should read --20--; line 25, the claim number reading "23" should read --22-- and the claim dependency reading "22" should read --21--.

Signed and Sealed this
Twenty-second Day of March, 2016

Michelle K. Lee
*Director of the United States Patent and Trademark Office*